United States Patent
Landoll et al.

(10) Patent No.: US 8,434,657 B2
(45) Date of Patent: May 7, 2013

(54) GANTRY-BASED WELDING SYSTEM AND METHOD

(75) Inventors: Donald R. Landoll, Marysville, KS (US); Jeffrey P. Germann, Marysville, KS (US); Hosea M. Harris, Downs, KS (US); Jeffrey L. Keating, Marysville, KS (US); Phillip R. Landoll, Marysville, KS (US); Daniel W. Kaller, Bremen, KS (US)

(73) Assignee: Landoll Corporation, Marysville, KS (US)

( * ) Notice: Subject to any disclaimer, the term of this patent is extended or adjusted under 35 U.S.C. 154(b) by 0 days.

(21) Appl. No.: 13/541,497

(22) Filed: Jul. 3, 2012

(65) Prior Publication Data
US 2012/0312862 A1 Dec. 13, 2012

Related U.S. Application Data

(63) Continuation-in-part of application No. 13/156,911, filed on Jun. 9, 2011, now Pat. No. 8,210,418.

(51) Int. Cl.
*B23K 37/04* (2006.01)

(52) U.S. Cl.
USPC .................. 228/9; 228/32; 228/43; 228/49.2

(58) Field of Classification Search .................. None
See application file for complete search history.

(56) References Cited

U.S. PATENT DOCUMENTS

| | | | |
|---|---|---|---|
| 3,241,736 A * | 3/1966 | Nesmith | 228/44.3 |
| 4,133,470 A * | 1/1979 | Trail | 228/44.3 |
| 4,169,977 A | 10/1979 | Pedersen | |
| 4,245,767 A * | 1/1981 | Hansen | 228/27 |
| 4,271,346 A * | 6/1981 | Hardy | 219/76.14 |
| 4,437,234 A | 3/1984 | Thornton | |
| 4,494,687 A * | 1/1985 | Rossi | 228/49.6 |
| 4,539,465 A | 9/1985 | Bosna | |

(Continued)

FOREIGN PATENT DOCUMENTS

| | | | |
|---|---|---|---|
| JP | SU-1368144 A | * | 1/1988 |
| JP | 2010052008 | | 3/2010 |
| SU | 1181839 A | | 9/1985 |

OTHER PUBLICATIONS

Derwent-ACC-No. 2011-J47504 which corresponds to CN-201871887U Chen et al. (published 2011).*

*Primary Examiner* — Kiley Stoner
(74) *Attorney, Agent, or Firm* — Law Office of Mark Brown LLC; Mark E. Brown; Christopher M DeBacker

(57) ABSTRACT

A multi-station, gantry-based automated welding system includes a gantry mounting robotic arc welders or other equipment. The gantry has a range of travel over multiple workstations, each workstation being adapted for rotatably mounting a respective workpiece on a headstock assembly and a tailstock assembly, which define a workpiece or weldment rotational axis extending therebetween. The tailstock assembly can be located at different positions within a workstation for accommodating different lengths of workpieces. Encoders are installed at the moving elements of the system for precisely tracking and providing output to the computer controller. Primary and secondary power/data distribution systems include cable and hose carriers for providing mobile power/data connections to the gantry and also to the robotic arc welders mounted thereon. The power/data distribution systems are elevated above a facility floor to avoid interfering with equipment, personnel and activities at floor level.

16 Claims, 22 Drawing Sheets

U.S. PATENT DOCUMENTS

| | | | |
|---|---|---|---|
| 4,579,652 A * | 4/1986 | Bielagus | 209/271 |
| 4,581,816 A * | 4/1986 | Klufas et al. | 29/705 |
| 4,659,903 A | 4/1987 | Berne et al. | |
| 4,667,866 A | 5/1987 | Tobita et al. | |
| 4,802,377 A | 2/1989 | Keppler | |
| 4,802,569 A | 2/1989 | Aidlin et al. | |
| 5,184,766 A | 2/1993 | Takahashi et al. | |
| 5,673,843 A * | 10/1997 | Gainey | 228/44.5 |
| 5,683,027 A | 11/1997 | Rintala | |
| 5,854,460 A | 12/1998 | Graf et al. | |
| 6,036,075 A | 3/2000 | Aebersold et al. | |
| 6,036,082 A | 3/2000 | Caldarone | |
| 6,070,781 A | 6/2000 | Johnson et al. | |
| 6,164,515 A | 12/2000 | Andrus et al. | |
| 6,168,065 B1 | 1/2001 | Willemen | |
| 6,220,502 B1 | 4/2001 | Gallinger et al. | |
| 6,380,514 B1 * | 4/2002 | Han | 219/125.1 |
| 6,464,208 B1 | 10/2002 | Smith | |
| 6,616,030 B2 | 9/2003 | Miller | |
| 6,622,906 B1 | 9/2003 | Kushibe | |
| 6,772,932 B1 | 8/2004 | Halstead | |
| 6,863,210 B2 | 3/2005 | Becker et al. | |
| 6,907,318 B2 | 6/2005 | Passmore et al. | |
| 7,478,597 B2 | 1/2009 | Schroeder et al. | |
| 7,784,666 B2 | 8/2010 | Iimura et al. | |
| 7,837,084 B2 * | 11/2010 | Simmons | 228/102 |
| 8,006,891 B2 | 8/2011 | Osicki | |
| 2002/0079301 A1 | 6/2002 | Bong et al. | |
| 2002/0134815 A1 | 9/2002 | Angel | |
| 2003/0189085 A1 | 10/2003 | Kilibarda et al. | |
| 2007/0012672 A1 | 1/2007 | Inoue et al. | |
| 2009/0045175 A1 | 2/2009 | Nishihara et al. | |
| 2009/0084828 A1 | 4/2009 | Sohl et al. | |
| 2010/0025349 A1 | 2/2010 | Khoshnevis | |
| 2010/0044414 A1 | 2/2010 | Charbel et al. | |
| 2011/0109022 A1 | 5/2011 | Flaig et al. | |
| 2011/0147436 A1 | 6/2011 | Maeno et al. | |
| 2011/0214586 A1 | 9/2011 | Wessel et al. | |

* cited by examiner

GANTRY-BASED WELDING SYSTEM AND METHOD

CROSS-REFERENCE TO RELATED APPLICATIONS

This application is a continuation-in-part of and claims the benefit of U.S. patent application Ser. No. 13/156,911, filed Jun. 9, 2011, now U.S. Pat. No. 8,210,418, issued Jul. 3, 2012, which is incorporated herein by reference.

BACKGROUND OF THE INVENTION

1. Field of the Invention

The present invention relates generally to automated welding, and in particular to a multi-station, gantry-based system for positioning and controlling robotic-arm welders for automatically welding rotatably-mounted workpieces.

2. Description of the Related Art

Automated or "robotic" manufacturing commonly involves computerized operation, control and positioning of tooling, equipment and workpieces. Robotic manufacturing has many advantages, including precision, repeatability, safety, efficiency and cost. Moreover, automated manufacturing facilities can operate continuously with relatively little downtime. Labor can be used efficiently by preprogramming the automated equipment for tasks which might otherwise be done manually. Workers are thus not exposed to dangerous, repetitive tasks and various hazards.

Robotic welders are an example of high-precision, computer-controlled automated manufacturing equipment. They are commonly used on assembly lines for a wide variety of products fabricated from metal. Vehicles and other products can be robotically welded to relatively tight tolerances. Robotic weldments are typically relatively uniform in strength and appearance, thus contributing to high quality finished goods.

Automated production often involves precisely and simultaneously coordinating movements of tooling and workpieces. For example, assembly line production generally involves moving workpieces from station-to-station where different operations are performed. Such assembly line tasks commonly include welding procedures, which can be done manually by welders or automatically by robots. Robotic arms with multiple articulated members can be preprogrammed to accomplish many of the tasks previously done by hand, and often achieve greater uniformity and precision. With precise control, the robotic arms can maneuver inside assemblies through multiple pivotal axes of movement. The computerized control system can precisely monitor and control attitudes and positions in three dimensions. The workpieces themselves can also be manipulated and synchronized with the welding equipment movements. For example, the workpieces can be turned as necessary to enable welding through 360° around joints. Both workpieces and welders can be simultaneously moved through three dimensions for optimal positioning and access. Relatively complex weldments can thus be achieved by preprogramming the equipment.

Movable gantries are commonly used in manufacturing for positioning manufacturing equipment relative to workpieces. For example, a computer control system can be preprogrammed to precisely place a gantry and the tooling mounted thereon over a workstation containing a workpiece. Upon completing a preprogrammed task, the gantry can automatically relocate to another workstation and workpiece. Alternatively, factory production workstations can include equipment for repositioning the workpieces. For example, workpieces can be rotatably mounted in workstations for access by tooling, including welding and painting equipment.

Gantry-based systems can be configured with elevated tooling and equipment. Such an arrangement has the advantage of locating tooling and equipment overhead, thus leaving factory floors free for workstation placement. Mobile gantries and equipment normally require power and utility lines which are configured for accommodating movements.

The multi-station, gantry-based welding system of the present invention facilitates performing multiple manufacturing operations precisely and simultaneously. Multiple workstations can be serviced by a single gantry configured for movement from station-to-station. The system of the present invention is configured for overhead placement of the power and utility lines, thus leaving the factory floor space below open for other uses. Locating the power and utility lines overhead tends to increase safety because they are less likely to be engaged by workers and equipment moving about the factory floor. Moreover, greater gantry mobility can be achieved by running the power and utility lines overhead because the elevated areas in factories tend to be more open than the factory floors. Space on factory floors is often at a premium with personnel, materials, equipment, forklifts, etc. in motion at floor levels.

The workstations movably mount respective workpieces, which are synchronized with gantry movements and also with robotic welding arms movably mounted on the gantries. Such simultaneous workpiece, gantry and equipment movements can be coordinated to consistently produce finished products, which can include complex shapes and component assemblies. By synchronizing the workpiece, gantry and equipment movements, such procedures can be accomplished from virtually unlimited relative orientations and positions of the moving parts of the system. A wide variety of finished products can be produced using a variety of procedures.

Heretofore there has not been available a multi-station, gantry-mounted welding system with the advantages and features of the present invention. In addition to robotic arm welding systems, other tooling and equipment can likewise be movably mounted on a gantry for movement relative to the workstations wherein the movable workpieces are located.

SUMMARY OF THE INVENTION

In the practice of the present invention, a multi-station, gantry-based welding system with overhead power and utility lines is provided. Multiple workstations are provided on a factory floor in alignment with a gantry path-of-movement. Each workstation rotatably mounts a workpiece under computer control for synchronizing with the movements of the gantry and the robotic-arm welding equipment mounted thereon. Power and utility lines are located in flexible, linked-section cable and hose carriers, which extend parallel to the path-of-movement of the gantry and maintain power and utility connections with the gantry throughout its range of movement. Cable and hose carriers are also installed on the gantry for providing power to the welding equipment throughout its range of movement.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION OF THE PREFERRED EMBODIMENTS

I. Introduction and Environment

Figure 1:
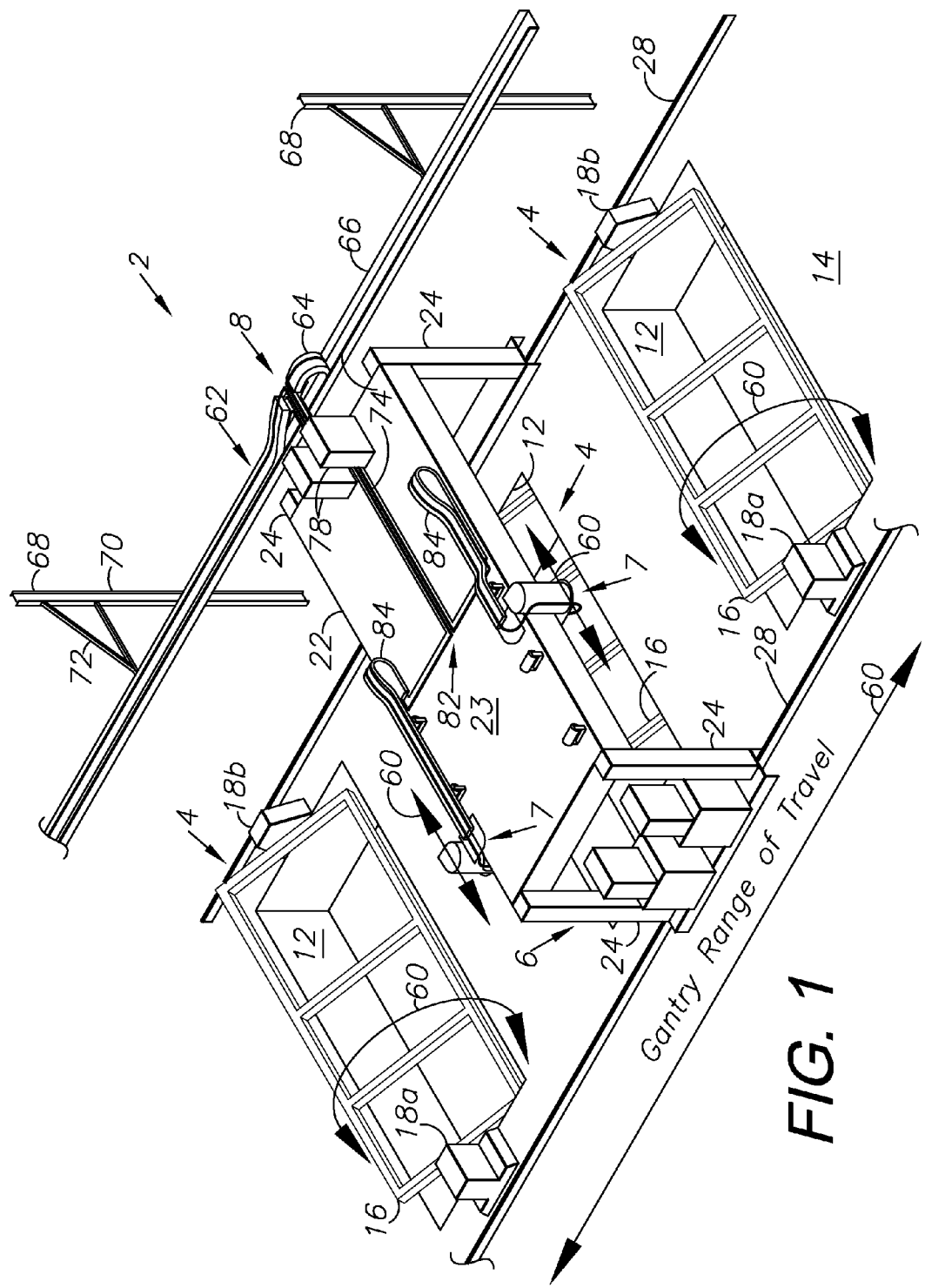
FIG. 1 is a perspective view of a gantry-based welding system including three workstations each rotatably mounting a weldment workpiece comprising a frame.

As required, detailed aspects of the present invention are disclosed herein;

however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the direction of travel, if appropriate. Said terminology will include the words specifically mentioned, derivatives thereof and words of similar meaning.

Referring to the drawings in more detail, the reference numeral 2 generally refers to a welding system with multiple welding stations 4 and a gantry 6 mounting a pair of robotic arm welders 7. The system 2 also includes a power/data distribution subsystem 8 and a control subsystem 10.

II. Workstations 4 and Workpieces 16

As shown in FIG. 1, three workstations 4 are generally located at respective recesses 12 formed in a factory floor 14. Each workstation 4 receives a respective workpiece 16 rotatably mounted on first and second rotary mounts 18a,b, at least one of which is powered by a motor 116 and includes an encoder 118 connected to the control system 10 for precisely rotating a respective workpiece 16. Various workpieces 16 can be accommodated by the system 2, which can be configured to perform a wide variety of procedures. For example and without limitation, the workpieces 16 shown in FIG. 1 comprise frame assemblies with multiple steel members, such as tubular steel sections. Without limitation, the system 2 can be configured for welding the frame assemblies 16 together. Thus, the frame assemblies 16 could be tack-welded together temporarily for mounting in the workstations 4. Alternatively, suitable jigs could be used at the workstations 4 for mounting the components of the frame assemblies 16 during welding. Precisely rotating the frame assemblies 16 during the welding operations enables the welders 7 to access the welded joints from all sides for maximum-strength weldments. Although a welding system 2 is shown and described as an example, other aspects of the present invention can perform other operations involving a wide variety of tooling and equipment acting on various workpieces. Additional examples include cutting, shaping, finishing, treating, assembling, inspecting and testing operations and procedures. Still further, the system 2 can be operated remotely, thus accommodating harsh environments and avoiding safety hazards associated with various operations and procedures. In other words, the system 2 can minimize operator risks associated with otherwise hazardous procedures because there is no need for operators in close proximity to the equipment and workpieces. Moreover, automating the operations performed by the system 2 tends to reduce operator risk because the robots and the material handling equipment can perform tasks which were previously done manually.

III. Gantry 6

The gantry 6 generally comprises a pair of end subframes 20a,b with a raised platform 22 extending therebetween.

Each end subframe 20a,b includes a pair of columns 24 mounting a channel-shaped lower crosspiece 26 with a pair of guide wheels 27 guiding the gantry 6 along a respective gantry guide rail 28. As shown in FIG. 1, a pair of guide rails 28 extends along either side of the line of welding stations 4. A gantry encoder 29 is mounted on the lower crosspiece 26 and includes a tracking roller 31 engaging and an encoder track 32. The gantry encoder 29 provides output signals indicating the precise position of the gantry 6 along the guide rails 28.

Each end subframe 20a,b also includes an upper crosspiece 30 connected to the platform 22. The platform 22 includes upper and lower decks 23, 25. The gantry 6 preferably comprises a relatively rigid structural assembly adapted for moving precisely along the guide rails 28 with the end subframes 20 maintaining parallel orientations on opposite sides of the workstation area. A drive mechanism 34 is mounted on a respective lower crosspiece 26 and is adapted for precisely driving the gantry 6 along the guide rails 28.

IV. Welders 7

Figure 5:
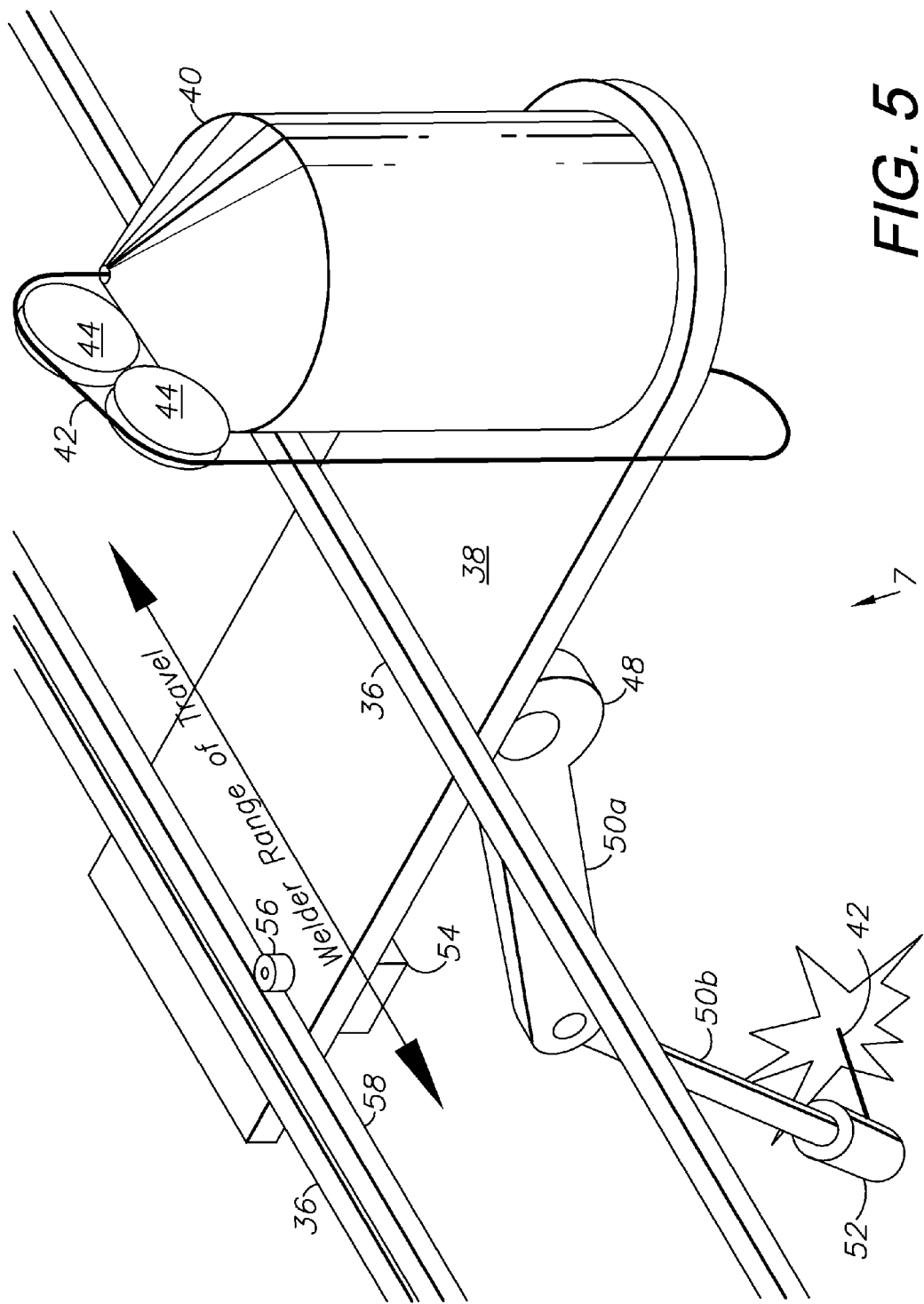
FIG. 5 is an enlarged, fragmentary view of the robotic arm welding subsystem.
Figure 6:
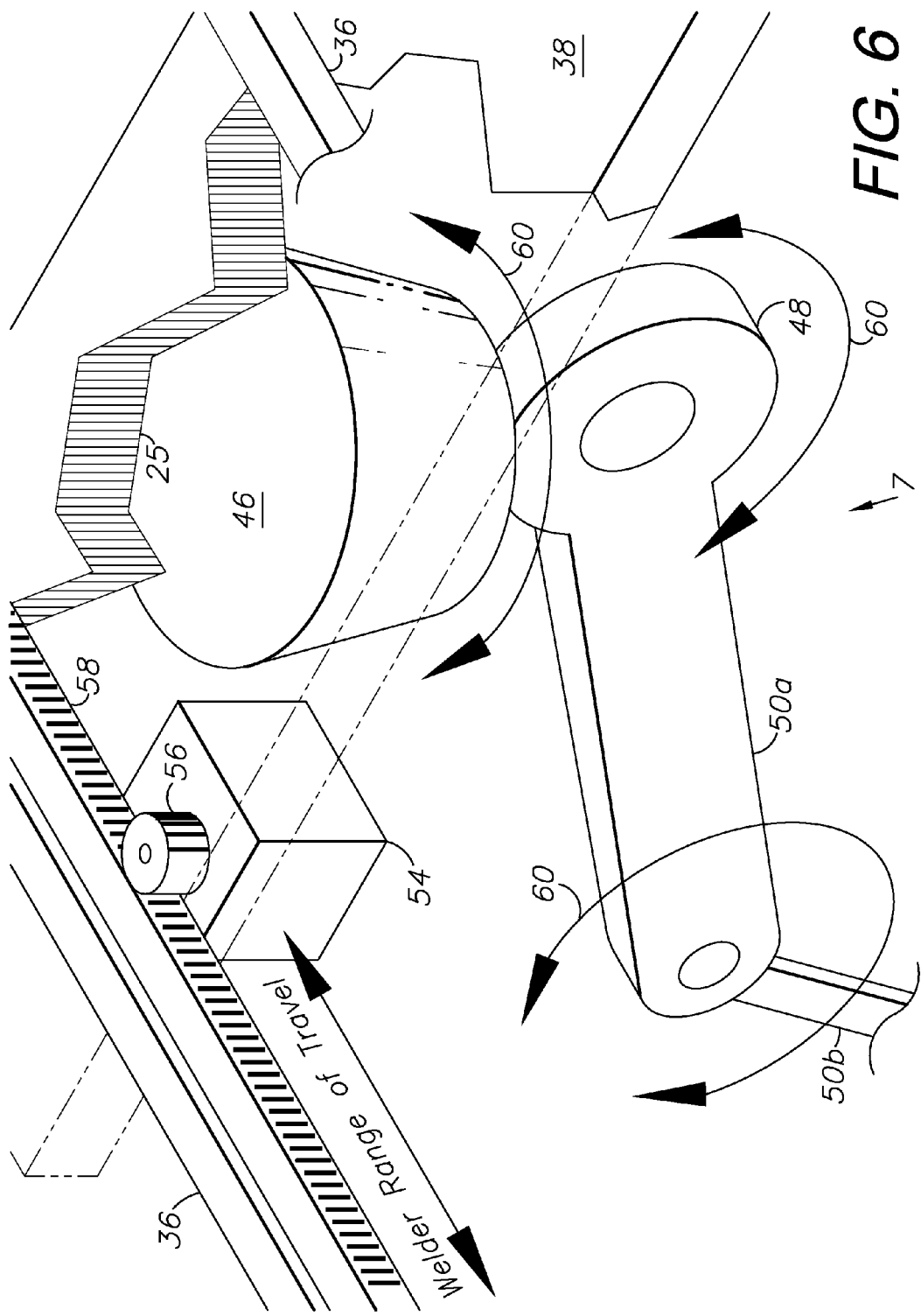
FIG. 6 is an enlarged, fragmentary view of the robotic arm welding subsystem taken generally within Circle 6 in FIG. 3.

Without limitation on the generality of useful equipment adapted for mounting on the gantry 6, the welders 7 can comprise Motoman arc welding robots, which are available from Yaskawa America, Inc. (www.motoman.com). Each welder 7 is movably mounted on a pair of robot guide tracks 36 located on the underside of the platform 22 and is adapted for traveling most of the length of the gantry 6 adjacent and parallel to a respective side of the gantry platform 22. As shown in FIGS. 5 and 6, each welder includes a base 38 slidably, movably mounted on the welder guide tracks 36 and a welding wire drum 40 located on an outboard, extending end of the base 38. Welding wire 42 is automatically fed to the robot welders 7 from the drums 40 and passes over welding wire rollers 44.

Each welder 7 includes a rotatable hub 46 mounted on the underside of the base 38 and adapted for rotation about a vertical rotational axis. An articulated arm 48 is pivotally connected to the hub 46 and includes proximal and distal arm sections 50a,b. The distal arm sections 50b mount rotating welding heads 52, from which the welding wire 42 extends for engaging the workpieces 16 in welding operations. The welders 7 are preferably fully-articulated and precisely controlled by the computer control system 10. Although arc welders are shown, the system 2 could include other types of welders and equipment within the scope of the present invention.

Each welder base 38 mounts a welder position encoder 54 adapted for precisely locating the welder base 38 along the welder guide rails 36. Each encoder 54 includes a tracking roller 56 engaging a welder encoder track 58 whereby relatively precise positioning of the welder 7 along the gantry 6 can be determined, which information is provided as input to the control system 10. Likewise, the precise position and orientation of the welding head 52 can be tracked and input to the control system 10 for precisely controlling the welding head 52 relative to a workpiece 16. Movement arrows 60 indicate rotational and linear movement of the various components of the system 2. For example, the arrows 60 in FIG. 6 indicate the movements of various components of a welder 7.

V. Power/Data Distribution System 8

The power/data distribution system 8 distributes electrical and other power to the gantry 6 for further distribution to the welders 7. Although electrical power can be used exclusively for the system 2, it will be appreciated that other types of service, power and utilities, such as gas, water, compressed air, hydraulic power, etc. can be distributed throughout the system 2. For example, acetylene torch welders could be used in lieu of the arc welders 7. A utility source, such as an electrical power panel in a facility, is connected to a primary mobile distribution 62 consisting of a flexible cable and hose carrier 64, which is preferably placed overhead at approximately the level of the gantry platform 22 generally in a primary carrier channel 66, which extends along one side of the recessed welding stations 4. The channel 66 can be supported by suitable structural supports 68, which can include freestanding columns 70 with extensions 72 extending laterally therefrom towards the workstations 4. Alternatively, the channel 66 can be suspended from overhead ceiling structure or structurally connected to the walls of the facility, which commonly include columns or structural walls to which the extensions 72 can be mounted.

Figure 7:
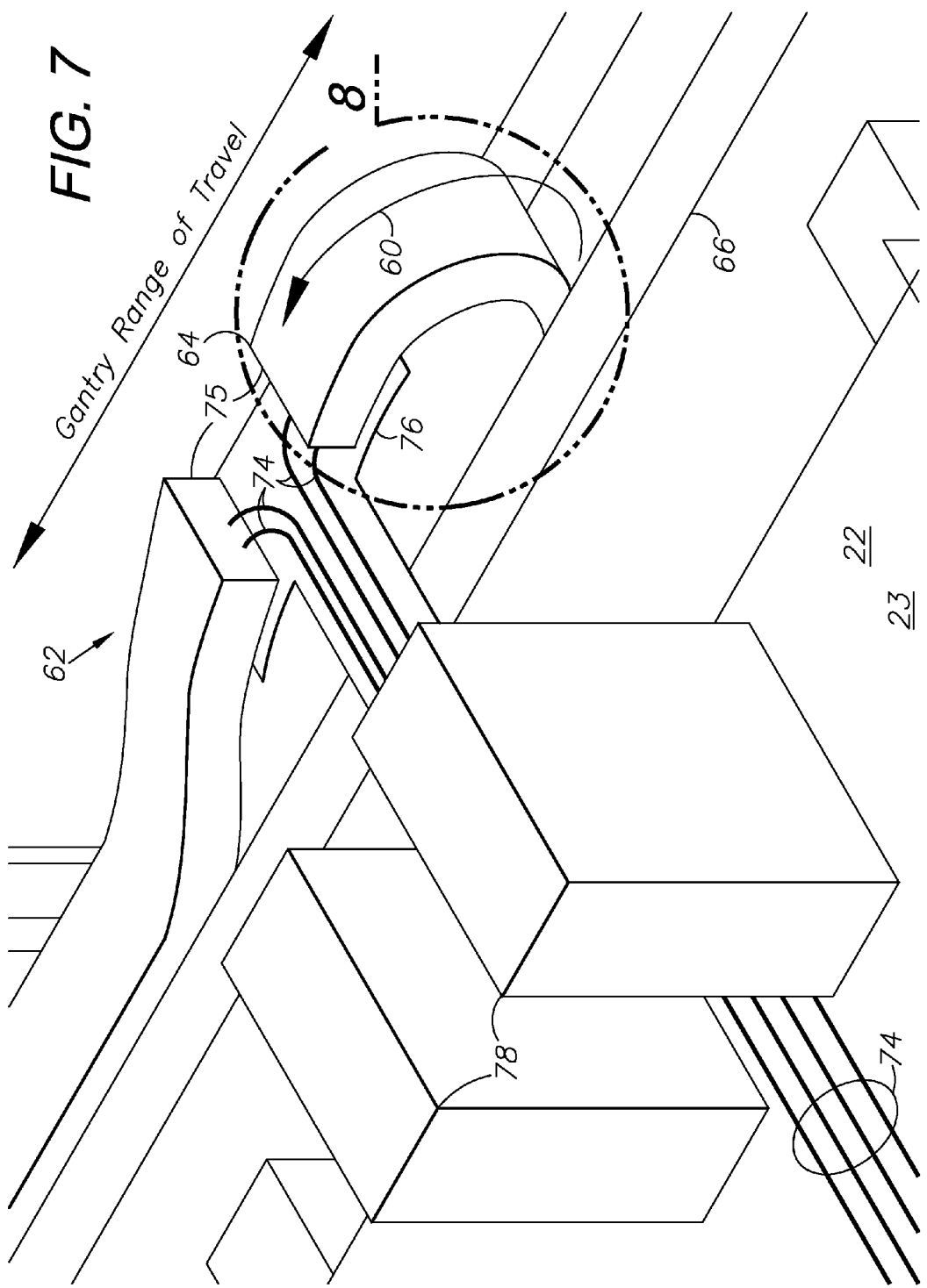
FIG. 7 is an enlarged, fragmentary view of an upper end of the gantry, particularly showing a power distribution system with a flexible cable and hose carrier connection with the gantry.
Figure 8:
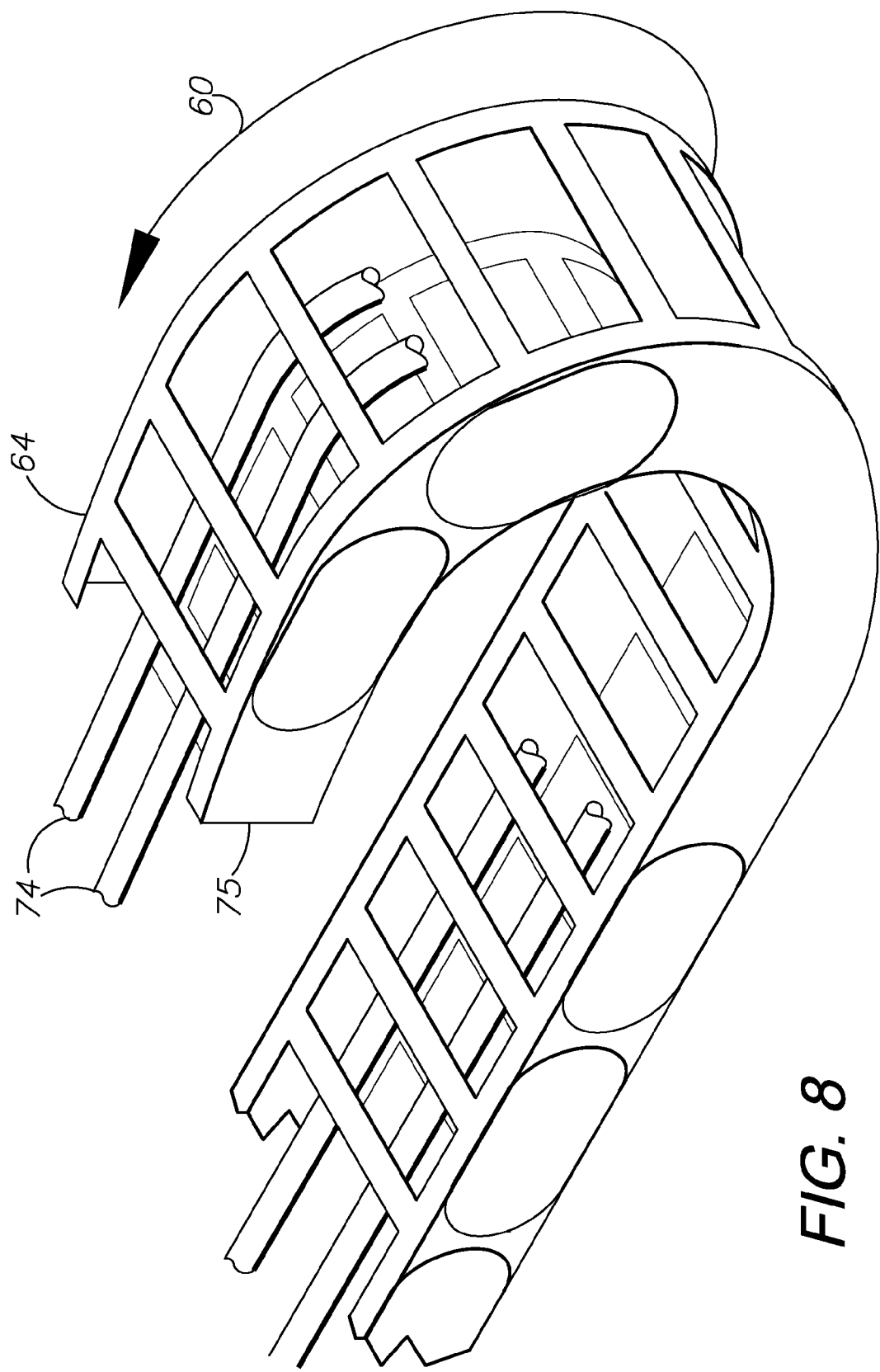
FIG. 8 is an enlarged, fragmentary view of the flexible cable and hose carrier, taken generally within Circle 8 in FIG. 7.
Figure 9:
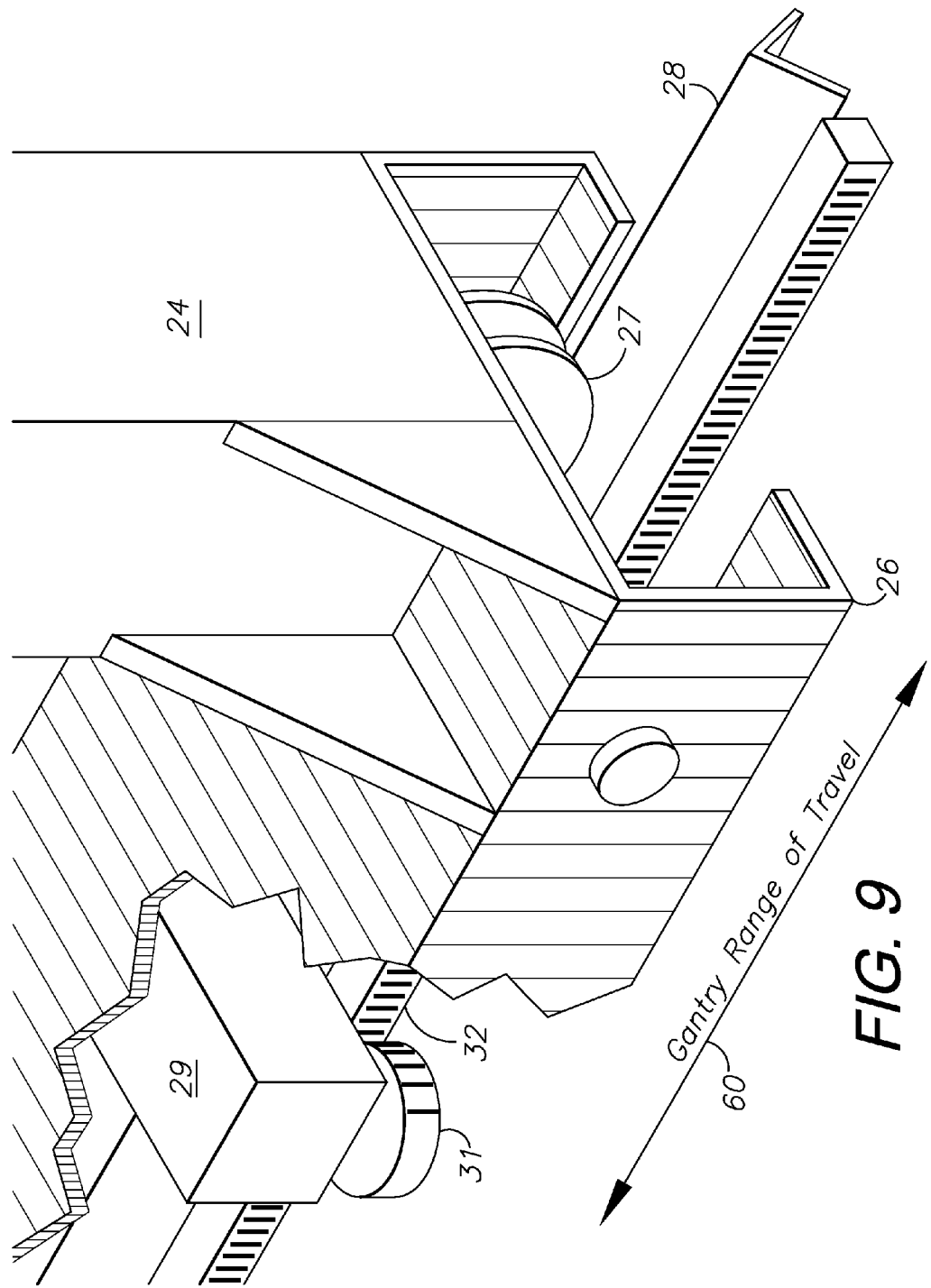
FIG. 9 is an enlarged, fragmentary view of a lower end of the gantry, particularly showing a guide wheel thereof on a guide track and an encoder adapted for tracking movement of the gantry, taken generally within Circle 9 in FIG. 3.

The primary carrier 64 can comprise a Gortrac® Nylatrac™ KS Series cable and hose carrier, which is available from cableorganizer.com (www.cableorganizer.com). The primary carrier 64 receives multiple cables and hoses 74, which can comprise electrical, data, pneumatic, hydraulic and other utility lines. The carrier 64 is adapted for flexing and doubling back on itself as the gantry 6 moves, as shown in FIGS. 1, 7 and 8, while maintaining the lines 74 in generally parallel relation, thus avoiding kinks and other potentially damaging situations. As shown in FIG. 7, a guide panel 76 extends outwardly from a gantry end subframe 20 and is connected to opposed ends 75 of the cable/hose carrier 64. The cables and lines 74 extend from the carrier ends 75 and turn at approximately 90° angles towards the gantry 6 and can be routed to suitable power distribution and control boxes 78. In operation, the primary carrier 64 maintains the cables and data lines 74 in continuous contact with the moving gantry 6 throughout its range of motion.

Figure 2:
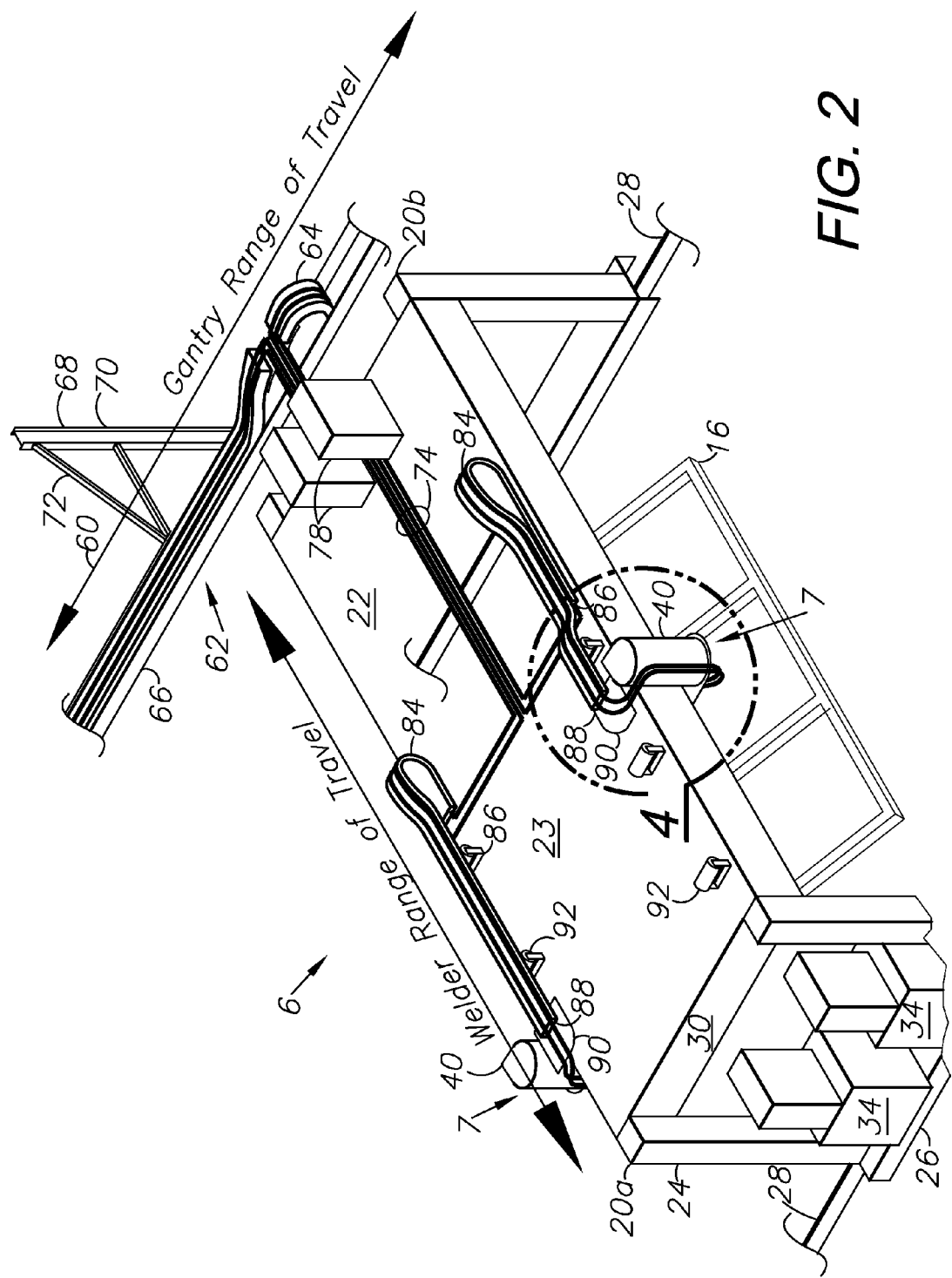
FIG. 2 is an enlarged, perspective view of a gantry, particularly showing a power distribution system therefor.
Figure 3:
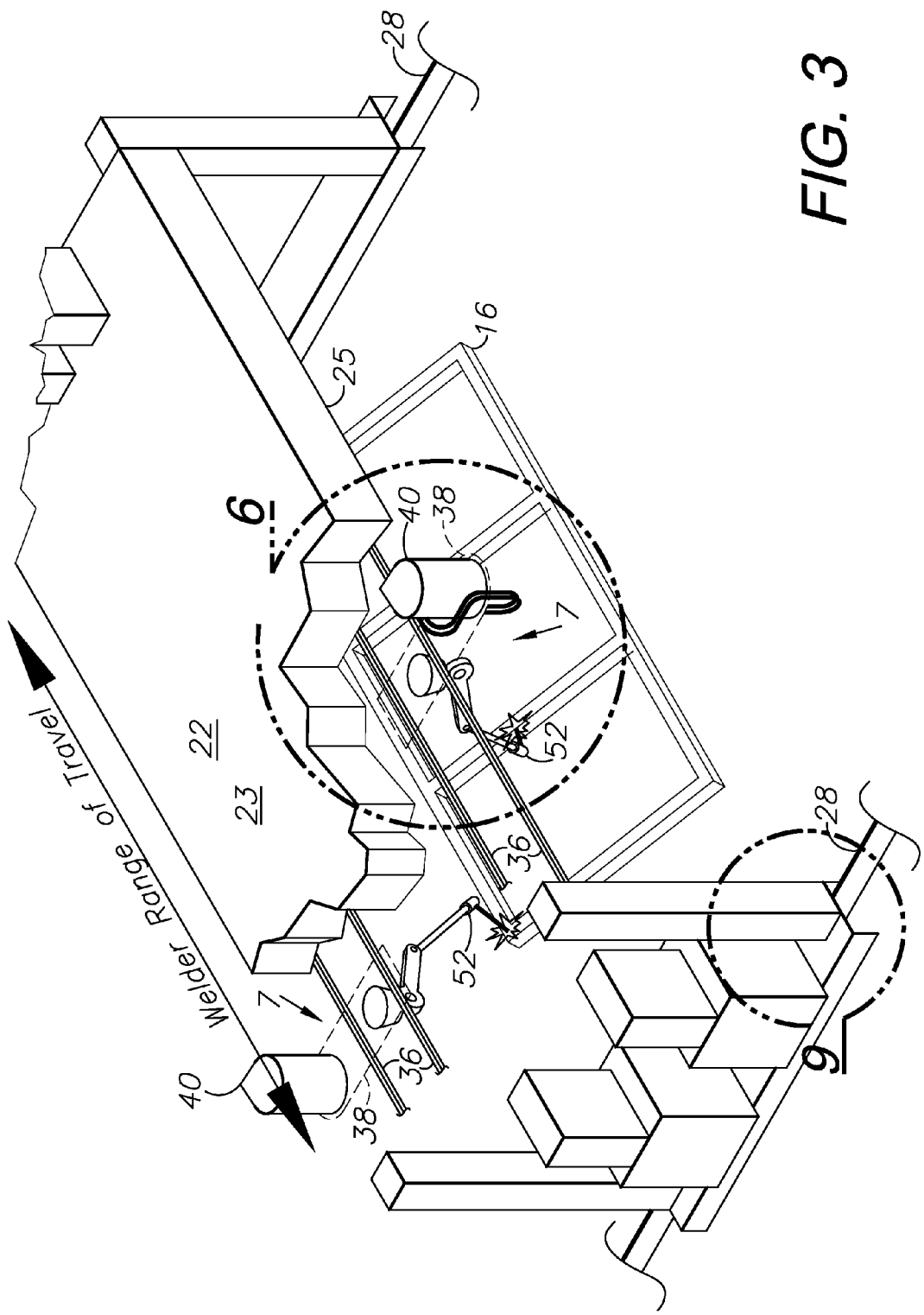
FIG. 3 is an enlarged, perspective view of the gantry with portions broken away to show a pair of robotic arm welders each mounted on a respective side of the gantry.
Figure 4:
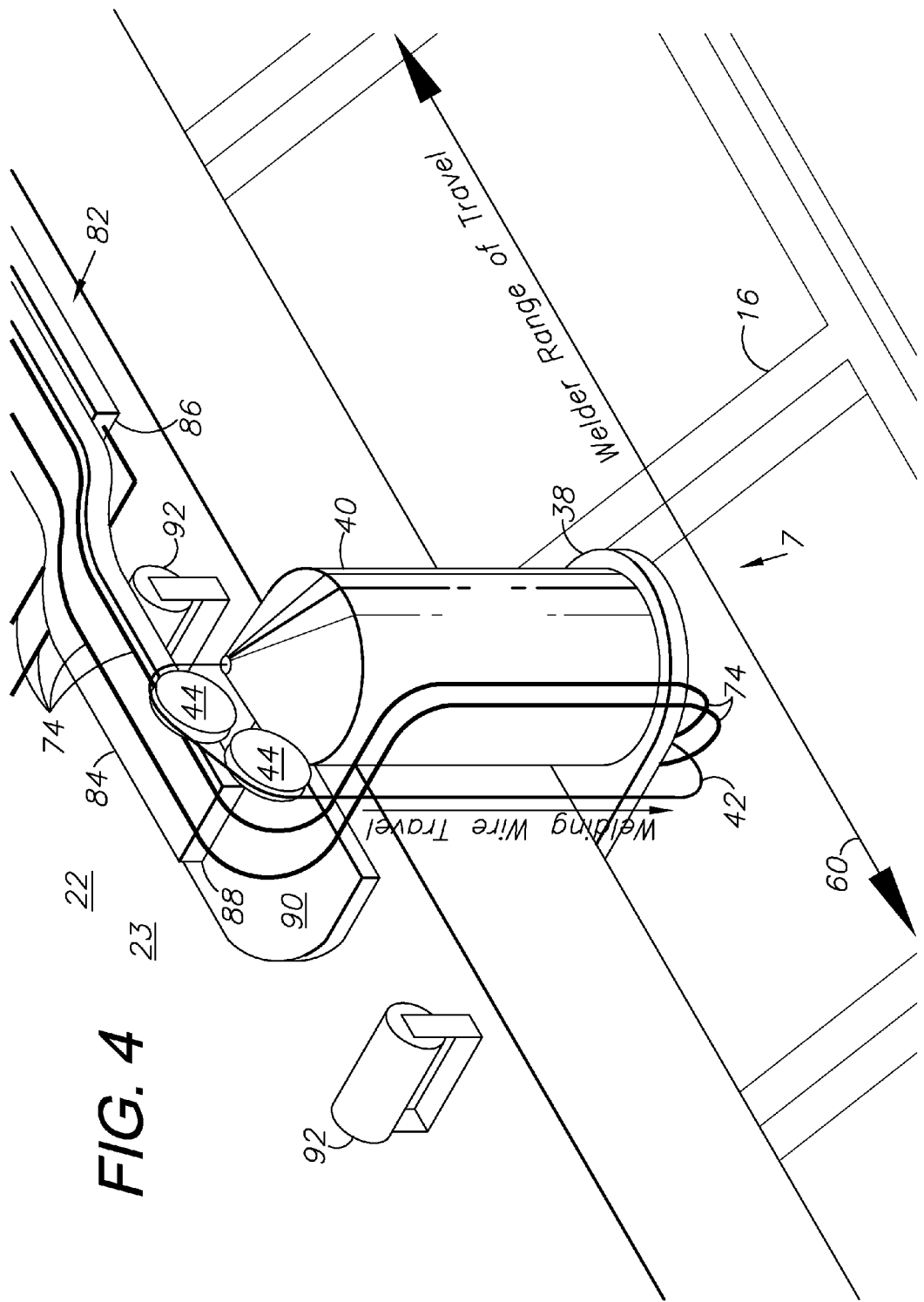
FIG. 4 is an enlarged, fragmentary view of the connection of the power distribution system with a respective robotic arm welding subsystem taken generally within Circle 4 in FIG. 2.

A secondary mobile distribution 82 distributes power and data signals to the welders 7 on board the gantry 6. A pair of cable and hose carriers 84 are mounted along each side of the gantry 6 and receive the cables and lines 74 from the primary mobile distribution 62 (FIG. 2). Each carrier 84 includes a first or input end 86 connected to and receiving power/data input from the primary mobile distribution 62, and further includes a second or output end 88 mounted on a welder cable and hose panel 90. At the welder cable and hose panels 90, the cables and lines 74 turn approximately 90° and are connected to the components of the welders 7. Rollers 92 are mounted on the platform upper deck 23 for supporting the secondary carriers 84 as they move with the welders 7. For example and without limitation, electrical power, data cables, welding gases, pneumatic power, hydraulic power and other utilities can be connected to the welders 7 via the cables and lines 74.

VI. Control System 10

Figure 10:
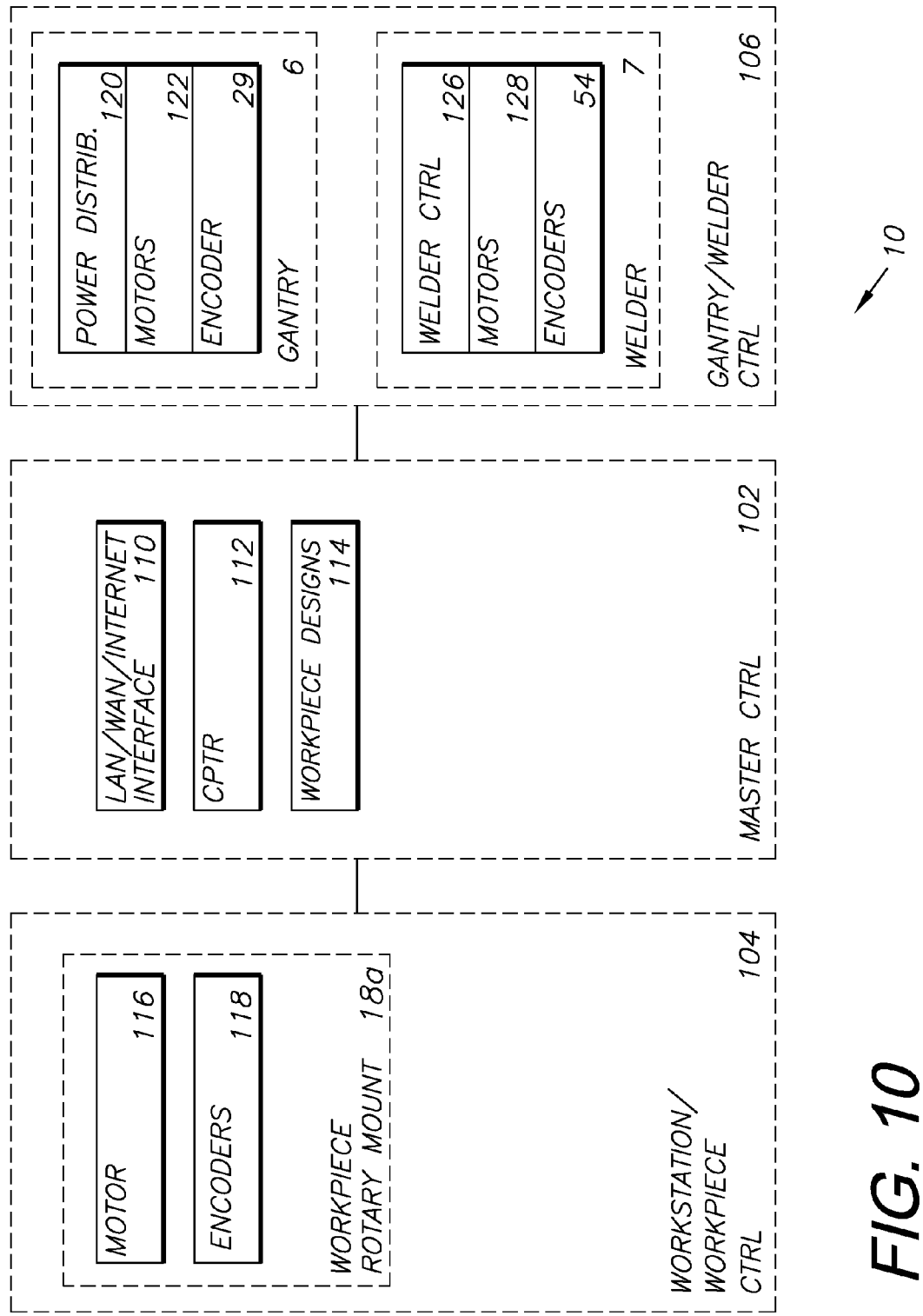
FIG. 10 is a schematic diagram of a computerized control system for the system of the present invention.
Figure 11:
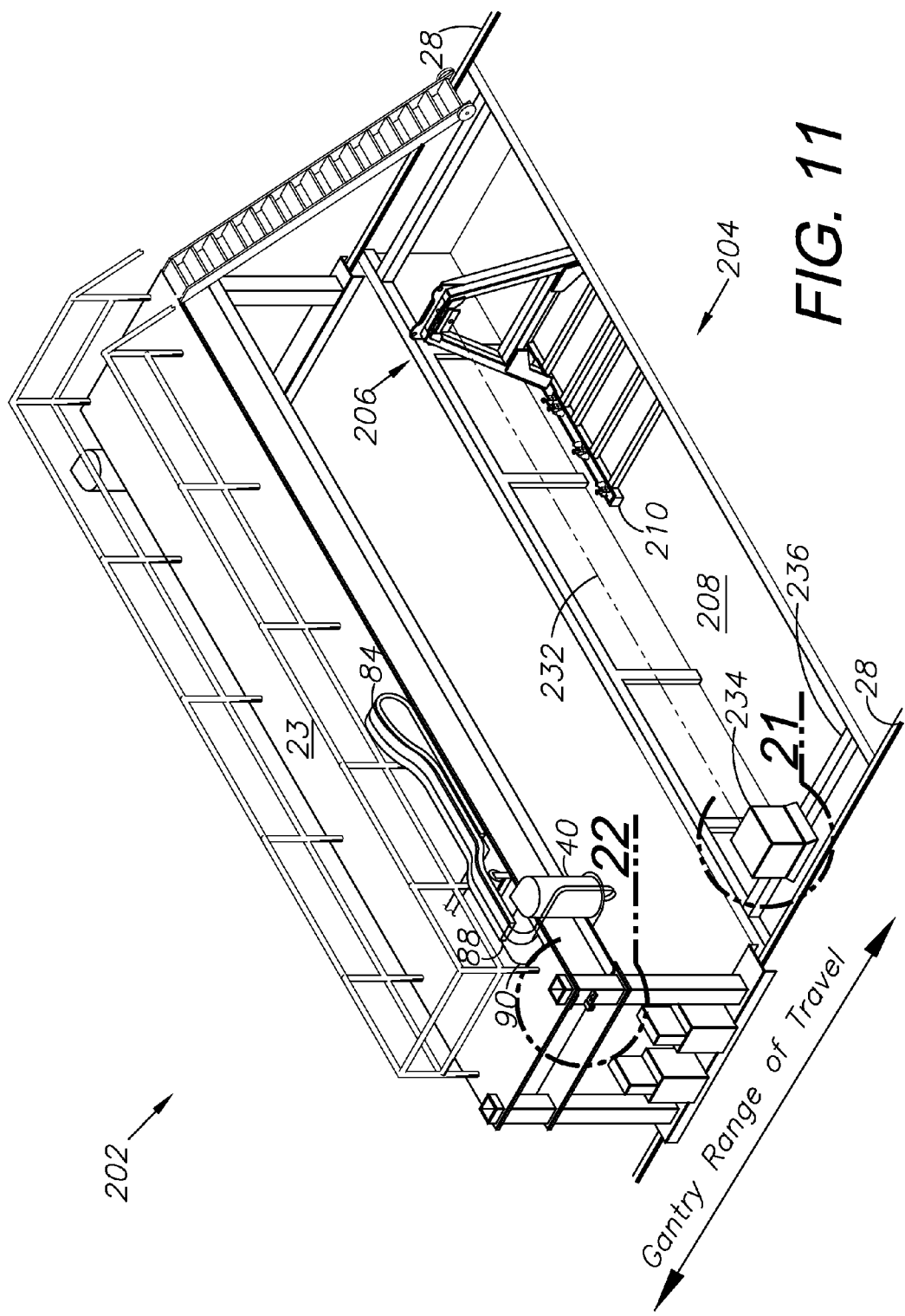
FIG. 11 is a partial, perspective view of a gantry-based welding system comprising a modified or alternative aspect of the present invention, particularly showing one of several welding stations accessible by the gantry and the robotic welders mounted thereon.

FIG. 10 shows an example of a control system 10 for the system 2, which generally includes a master controller 102, a workstation/workpiece controller 104 for the workstations 4 and a gantry/welder controller 106. The master controller 102 includes an interface 110, which is adapted for interfacing with a network such as a local area network (LAN) or a wide area network (WAN). The interface 110 can use any suitable data link including telecommunications lines or a wireless interconnection, e.g., an RF transceiver. The interface 110 can also link to the Internet (World Wide Web).

The system 2 can thus be configured for operating in conjunction with other resources in a manufacturing facility or even a global operation. For example, automated manufacturing instructions and information can originate from remote locations for implementing by the system 2 located at a manufacturing facility. In an automated operation, the gantry-mounted welding system 2 can interface with other manufacturing operations, such as material forming, finishing and testing. For example, the workpieces 16 can comprise frames for agricultural implements, which are welded together by the system 2. Other manufacturing operations for the implements could be performed by systems similar to the gantry-mounted system 2, whereby the frames 16 and other implement components could be automatically transported from system-to-system for final assembly with other automated equipment. The gantry-mounted system 2 is scalable whereby additional workstations 4 and gantries 6 can be added as needed. Moreover, each gantry 6 can mount different combinations of equipment appropriate for the operations being performed. Still further, the system 2 can be programmed for manufacturing customized workpieces, as well as repetitive, standardized production.

A computer 112 is connected to the interface 110 and is adapted to receive workpiece designs 114 in suitable digital formats, such as CAD/CAM files corresponding to a wide variety of components. The computer 112 can comprise a standalone unit or a terminal comprising part of a network. Preferably the computer 112 is programmable for controlling the operations of the system 2, including positioning the workpieces 16, the gantries 6 and the welders 7, as well as other aspects of the operation.

The workstation/workpiece controller 104 includes motors 116 in the workpiece rotary mounts 18a for rotating the workpieces 16 and encoders 118 for precisely measuring the workpiece 16 rotary movements and providing corresponding output to the computer 112.

The gantry/welder controller 106 controls power/data distribution 120, positioning motors 122 and a position-responsive encoder 29 mounted on the gantry 6. The automated welders 7 can include welder controls 126, motors 128 and encoders 54 precisely controlling and positioning the automated welding operations.

VII. Alternative Gantry Welding System 202

FIGS. 11-22 show a gantry welding system 202 comprising a modified or alternative aspect of the present invention. The gantry welding system 202 is similar in many respects to the gantry welding system 2 described above, with modified welding stations 204 each including a movable, track-mounted tailstock assembly 206 located in a respective recess or pit 208. Tailstock guide rails 210 are mounted on the floor of each recess or pit 208 and support the respective tailstock assembly 206 on a pair of guide block assemblies 212 for adjustably mounting the tailstock assembly 206 at predetermined positions along the length of a respective pit 208. The various tailstock assembly 206 positions accommodate different sizes of fixtures or workpieces being welded. Each tailstock guide rail 210 includes multiple positioning cones 216 extending upwardly at predetermined locations corresponding to the tailstock assembly positions.

Figure 20:
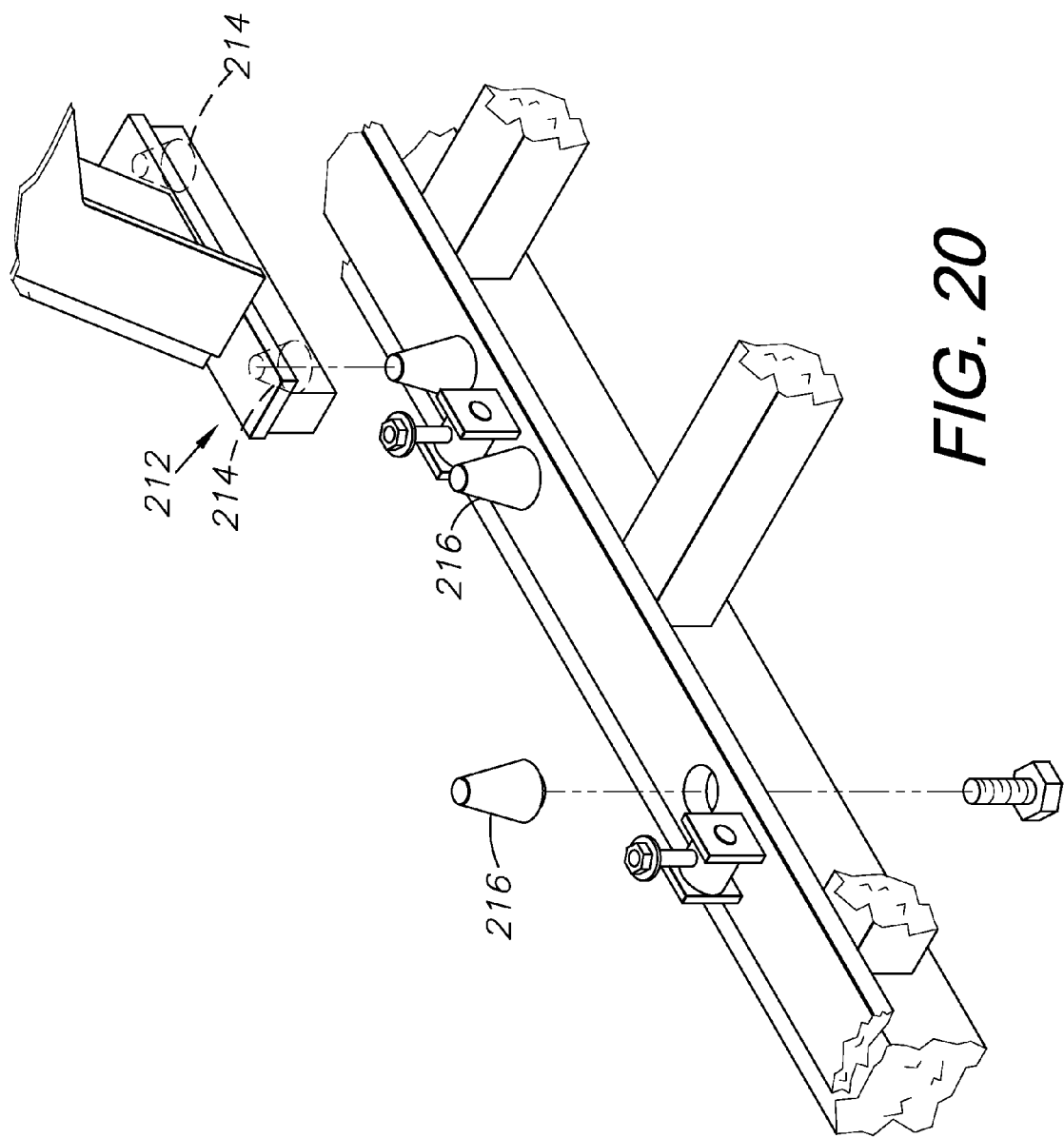
FIG. 20 is a perspective view of the tailstock guide rails, particularly showing the cones mounted thereon and taken generally within Circle 20 in FIG. 14.
Figure 21:
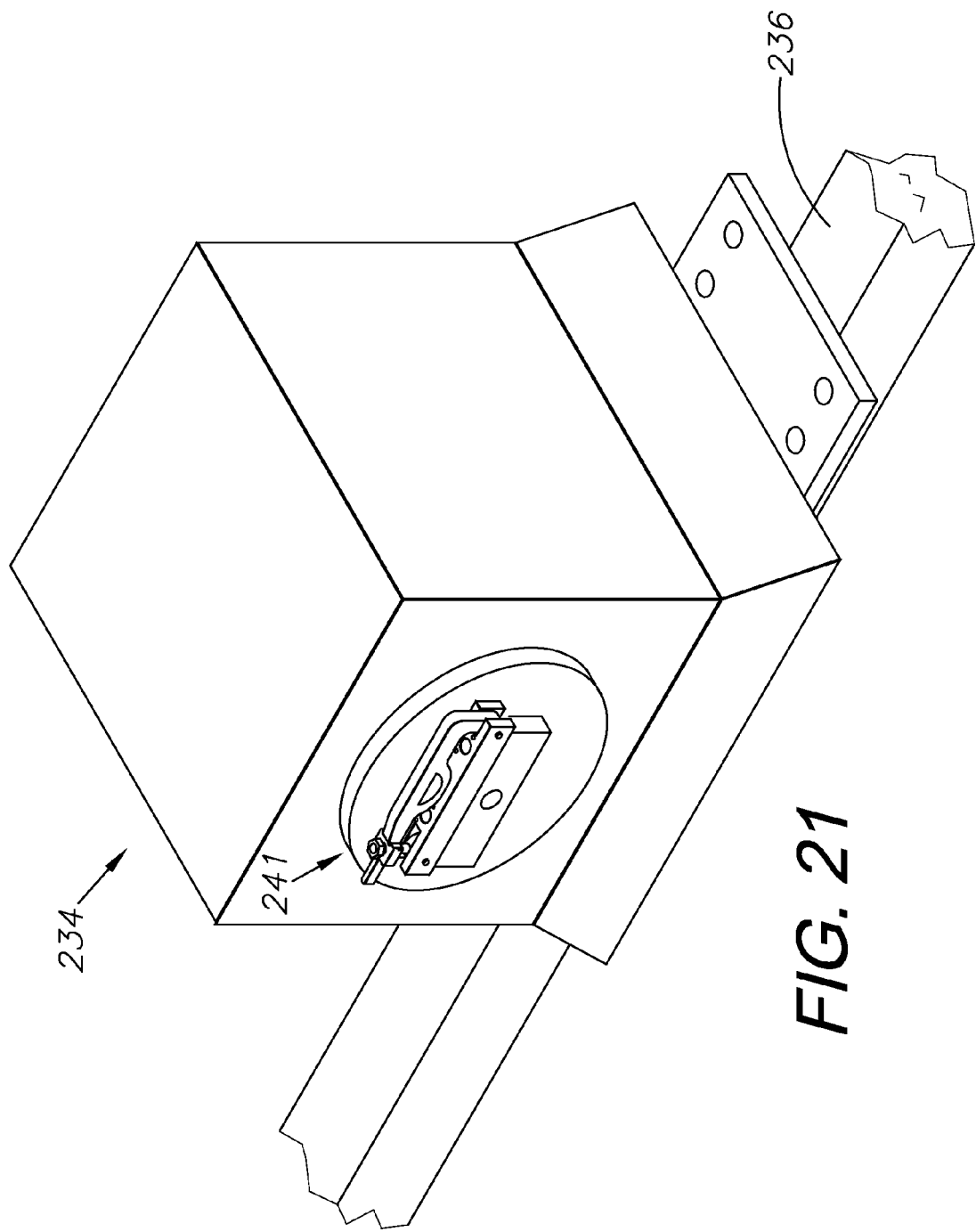
FIG. 21 is a perspective view of the headstock assembly, taken generally within Circle 21 in FIG. 11.
Figure 22:
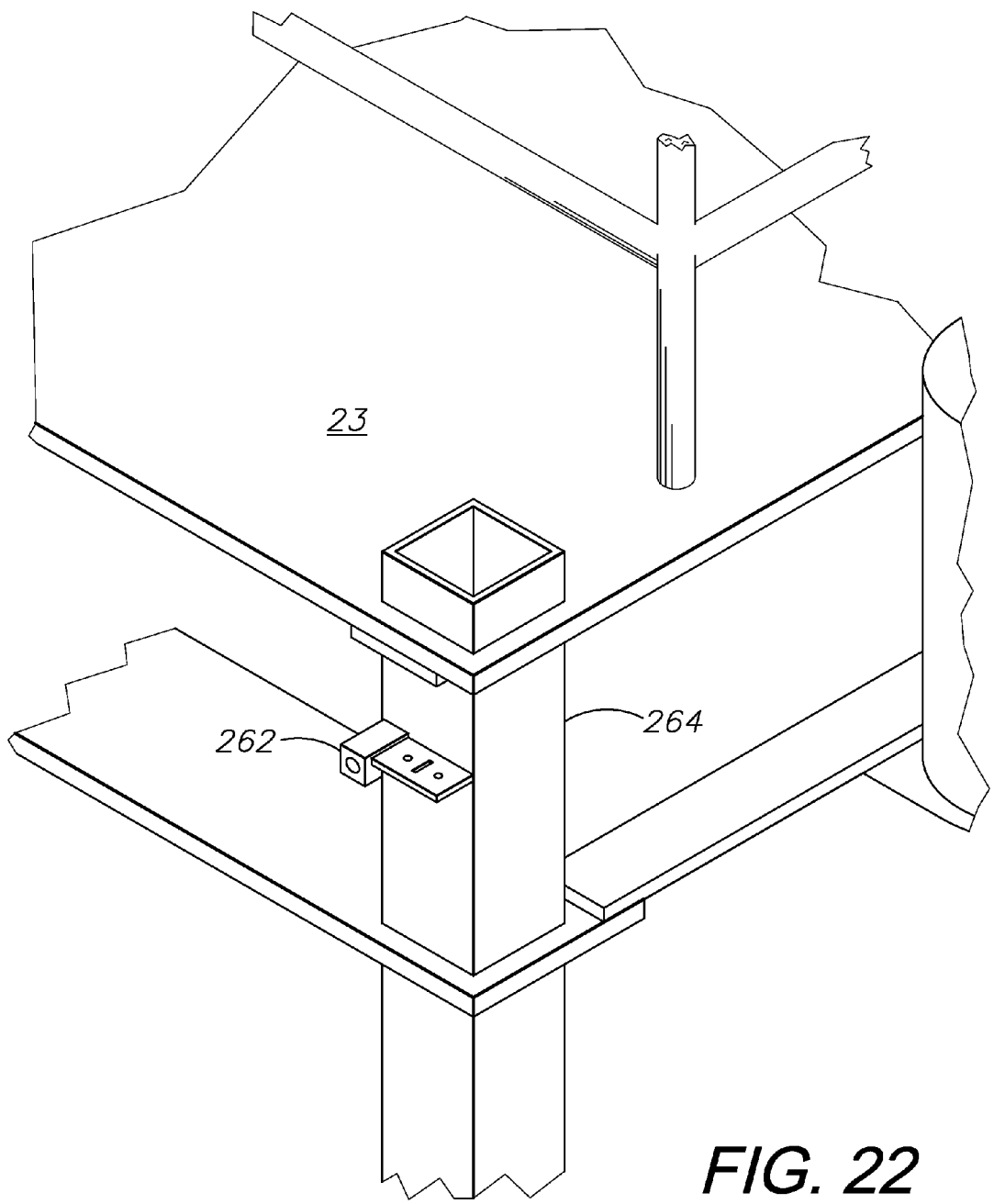
FIG. 22 is a perspective view of an upper corner of the gantry, particularly showing a travel limit switch construction and taken generally within Circle 22 in FIG. 11.

Each tailstock assembly 206 generally includes an A-frame 218 with a pair of upwardly-converging legs 220 terminating at feet 222 mounting the guide block assemblies 212. Upper and lower tailstock crossbars 224, 226 extend between the legs 220. The tailstock guide block assemblies 212 have corresponding tapered locating receivers 214 for receiving respective positioning cones 216, which are adapted for relatively precisely positioning the tailstock assemblies 206 (FIG. 20). Swing bolts 250 are provided for securing the tailstock guide block assemblies 212 to the tailstock guide rails 210. A pair of lifting ears 225 are mounted on the upper crossbar 224 (FIG. 13) and are adapted for connection to an overhead crane for positioning the tailstock assembly 206.

The upper crossbar 224 rotatably mounts a workpiece clamp 228 by a spindle-and-block mount 230, which attaches to the underside of the upper crossbar 224 by a mounting plate 231. A workpiece rotational axis 232 is defined by the spindle-and-block mount 230 and extends longitudinally to a headstock assembly 234, which is mounted on the factory floor 14 at a respective end of the pit 208 (FIG. 21) on a suitable headstock mounting frame 236, which can be anchored to the other welding system frame members and the adjacent structure, such as a steel frame embedded in or anchored to a concrete slab. The rotational axis 232 can be located at any suitable height above the factory floor 14, for example approximately three feet.

As compared to the gantry welding system 2 described above, locating the movable tailstock assembly 206 in the pit 208, combined with the upwardly-converging A-frame 218 configuration, provides extra clearance around a workpiece assembly 254, which accommodates movements and access by the robotic welders 7. For example, the welders 7 can pass relatively closely to the rotational axis 232 at each end without interfering with or engaging the tailstock assembly 206 or the workpiece assembly (also referred to as a fixture) 254. Greater flexibility in automated welding operations and more efficient equipment movements can thus be achieved with the alternative configuration. The controls for the welding system 202 include appropriate safety devices, such as a limit switch 262 mounted at an upper end of a gantry column 264 (FIG. 22), and adapted for shutting off power to the welder drive motors in the event of overtravel to avoid damage in the event of a welder positioning system malfunction.

VIII. Tailstock Clamp Subassembly 240

Figure 17:
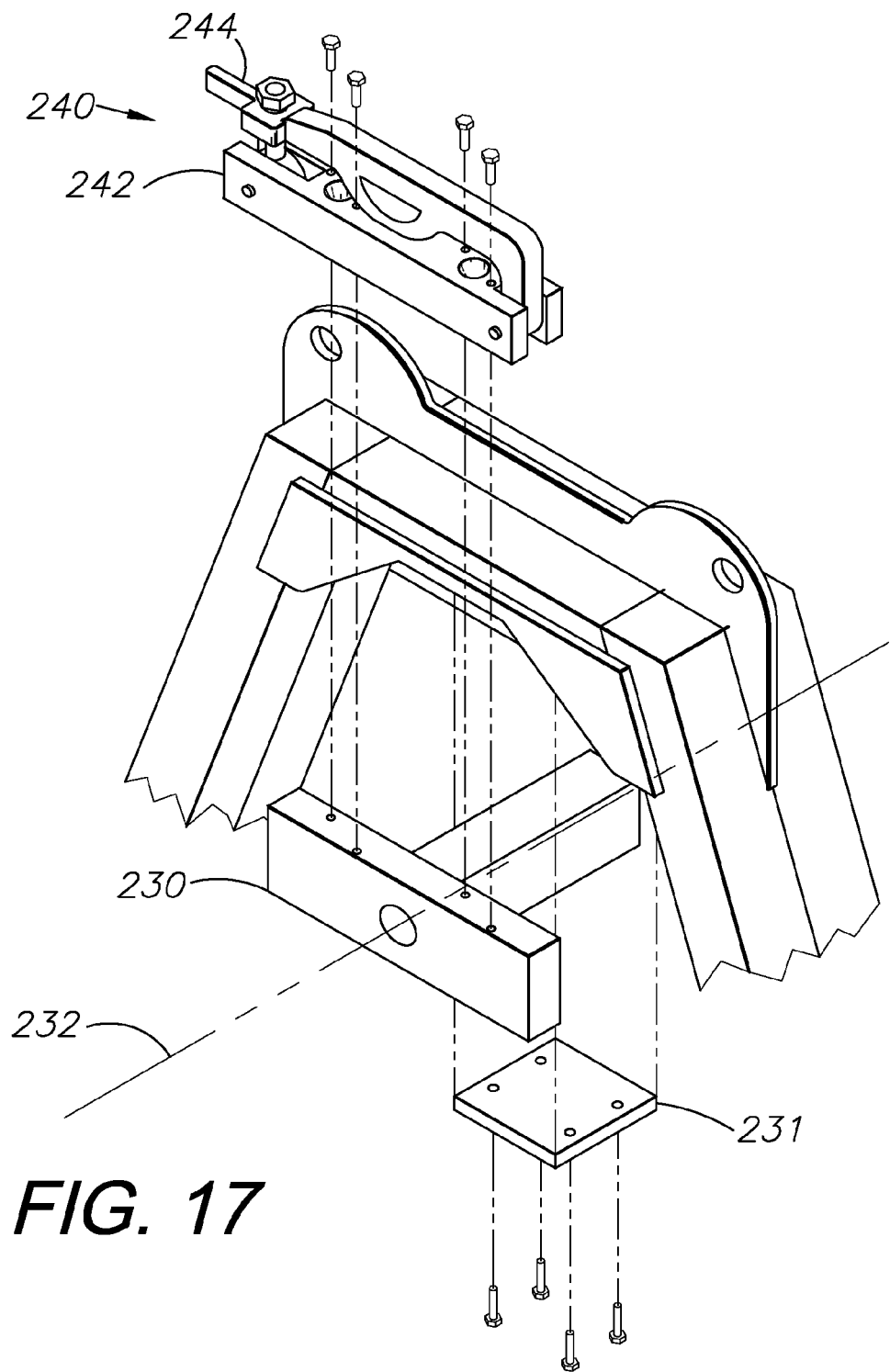
FIG. 17 is an exploded, perspective view of the upper end of the tailstock assembly.

Each tailstock assembly 206 mounts a tailstock clamp subassembly 240 including a clamp base 242 mounted on the spindle-and-block 230 by a mounting plate 231 (FIG. 17). A clamp arm 244 includes a proximate end 246 hingedly mounted on the base 242 and a distal end 248 adapted for releasable attachment in a clamping engagement by a swing bolt 250, which is pivotally connected to the base 242 and receives a clamping nut 252 whereby the clamp arm 244 can be tightened into clamping engagement with a workpiece assembly 254. The clamp arm 244 includes a downwardly-convex compression flange 245, which extends downwardly into a workpiece receiver gap 260, and includes a downwardly-facing clamp arm mating surface 247 adapted for engaging a workpiece 254 clamped in the tailstock assembly 206 by the swing bolt 250.

Figure 18:
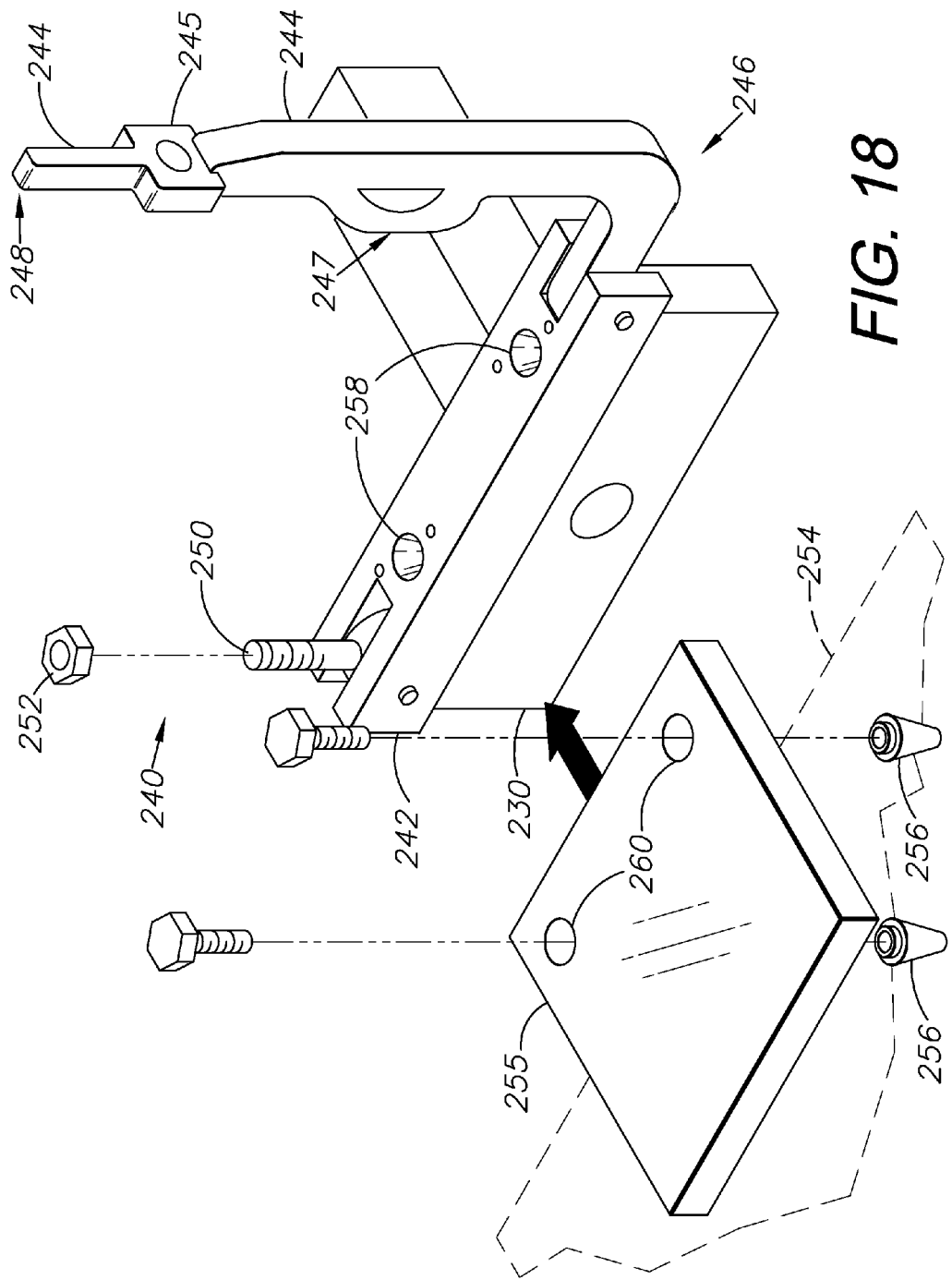
FIG. 18 is an exploded, perspective view of the clamp subassembly and the workpiece or fixture plate, showing the mounting of the locating cones.

The workpiece or fixture assembly 254 and the tailstock clamp subassembly base 242 can be relatively precisely aligned by using tapered alignment cones 256, which can be mounted on a plate 255 extending from the workpiece 254 for temporary placement in corresponding tapered receivers 258 in the tailstock clamp subassembly base 242 (FIG. 18). This arrangement enables quickly, precisely and efficiently positioning the workpiece assembly 254 on the clamp subassembly base 242 for the duration of the automated welding operation. Relatively precise welds can thus be made with the workpiece assembly 254 in various orientations, including relatively complex welds utilizing the multi-axis, automated movements of the robotic welders 7 through three dimensions, i.e. corresponding to "six degrees of freedom."

Each headstock assembly 234 also includes a clamp subassembly 241, which is similar to the tailstock clamp assembly 240 described above (FIG. 21).

IX. Automated Welding Process

Figure 12:
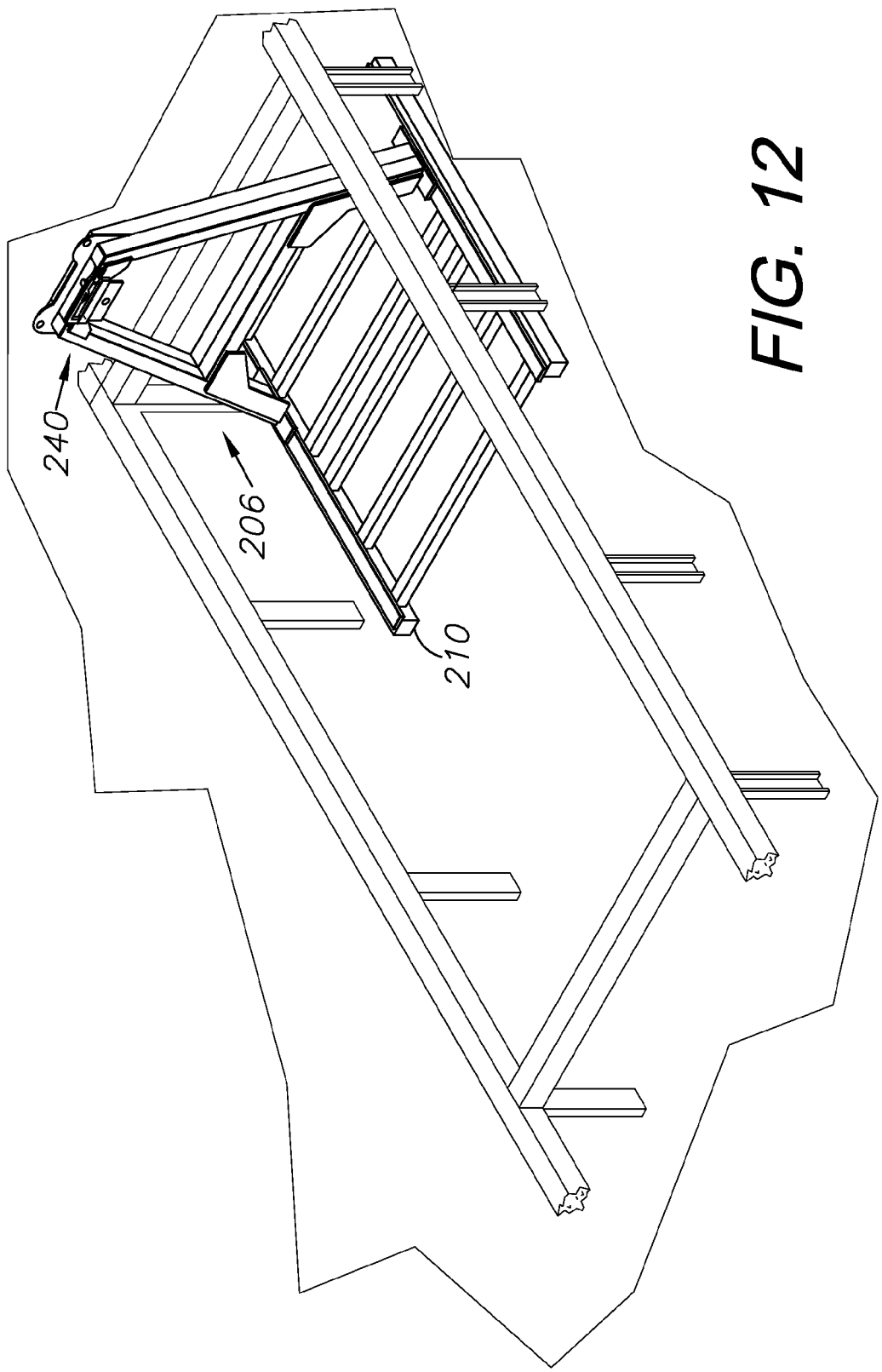
FIG. 12 is an enlarged, perspective view thereof, particularly showing a movable tailstock assembly mounted in a welding station recess.
Figure 13:
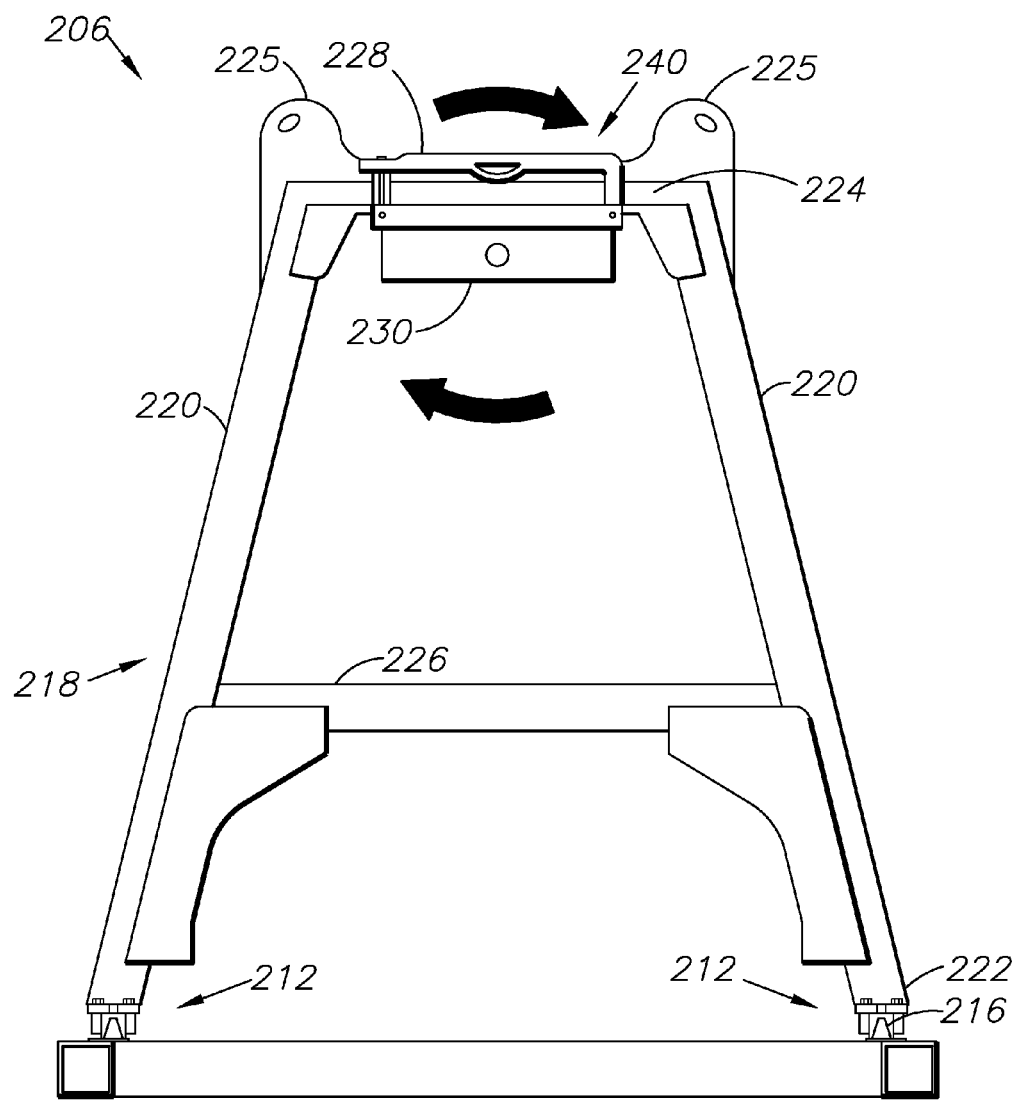
FIG. 13 is an enlarged, perspective view of the tailstock assembly, particularly showing a clamp for clamping a workpiece in position.
Figure 14:
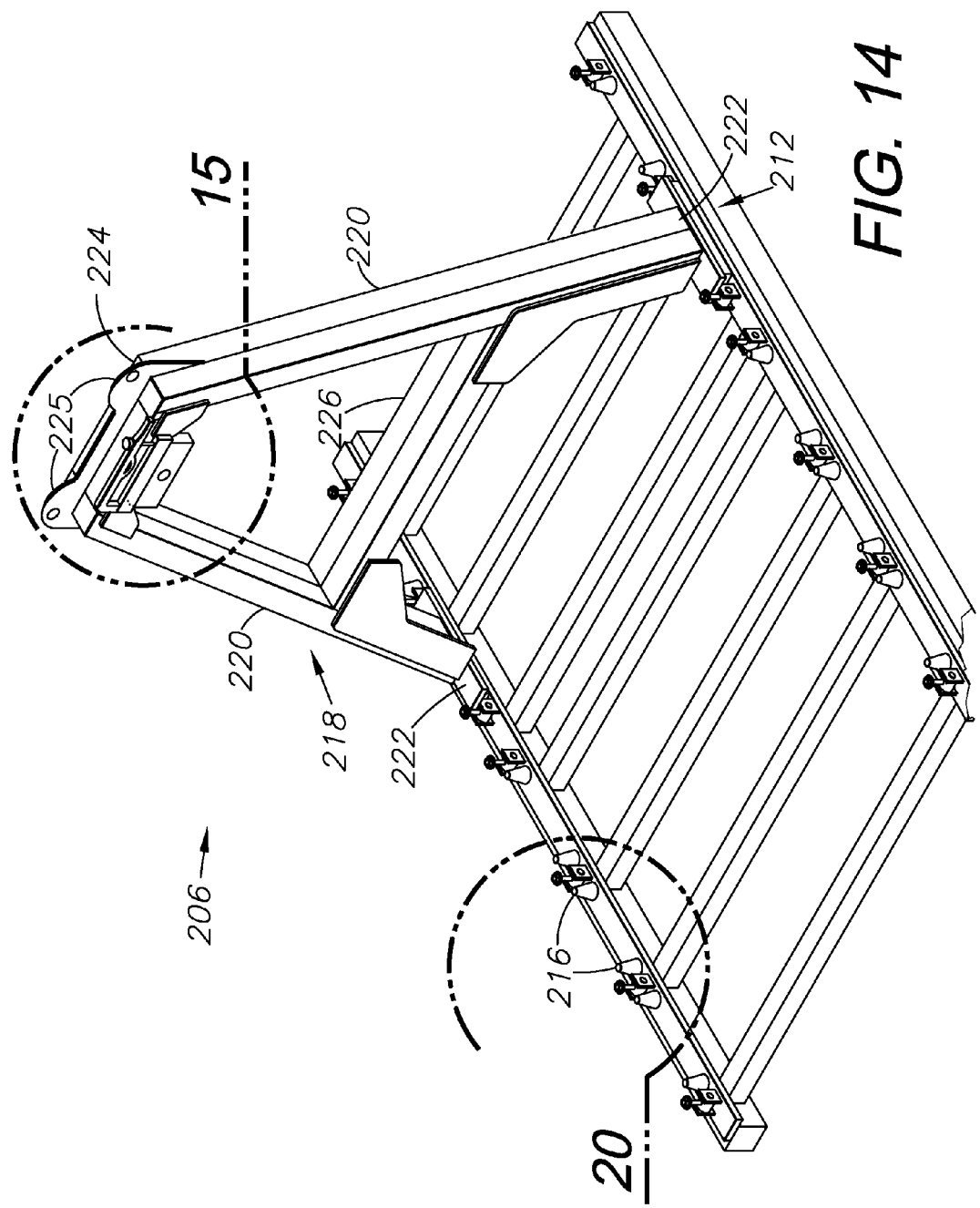
FIG. 14 is a fragmentary, perspective view of the tailstock assembly mounted on the tailstock guide rails.
Figure 15:
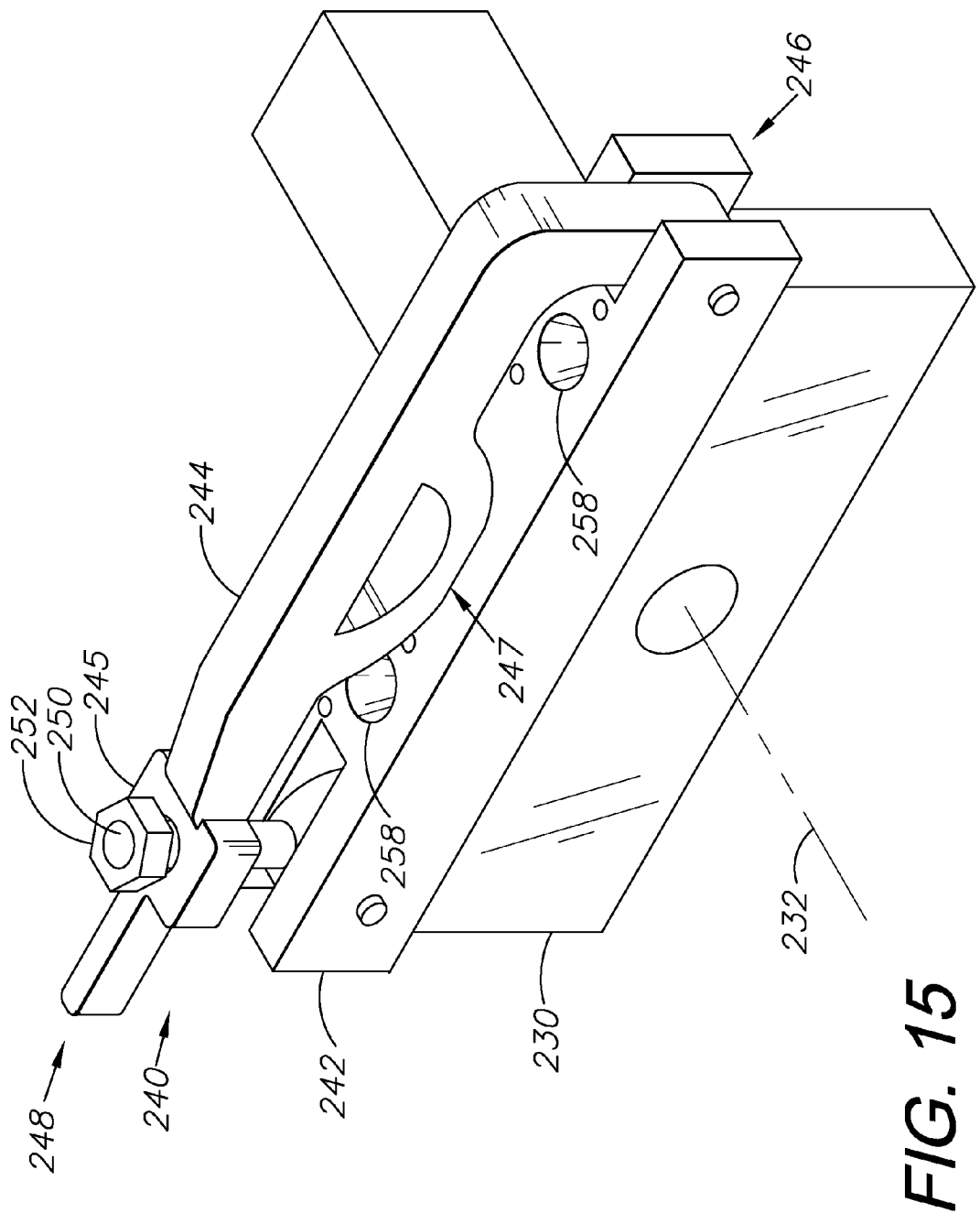
FIG. 15 is a perspective view of a workpiece clamp subassembly, shown in a closed position thereof and taken generally within Circle 15 in FIG. 14.
Figure 16:
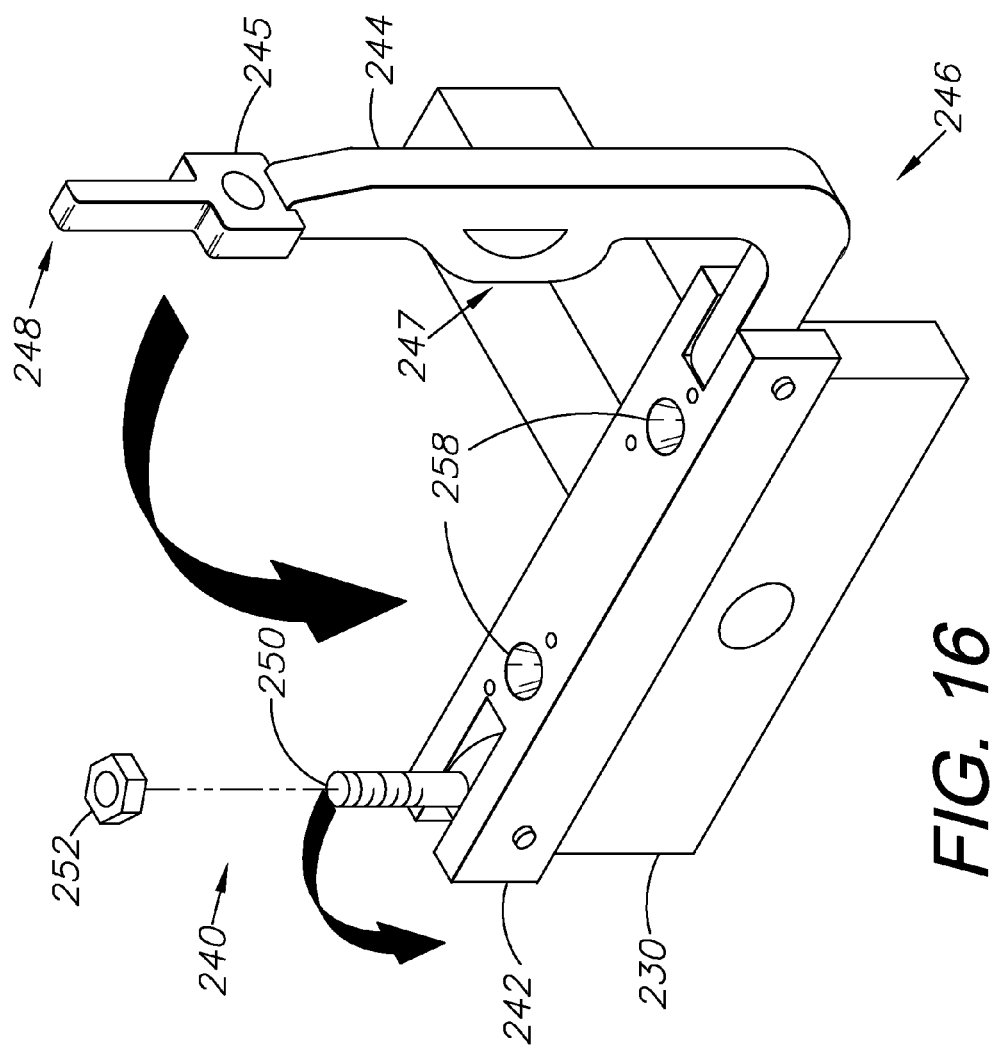
FIG. 16 is a perspective view of the workpiece clamp subassembly, shown in an open position thereof.

The gantry weld system 202 (FIG. 11) is adapted for automated or robotic welding of the workpiece assembly or fixture 254 using the robotic welders 7 described above. The system 202 is adjustably and variably configured for the length of the workpiece assembly 254 by placing the tailstock assembly 206 at the appropriate, predetermined position (FIG. 12). The welding system 202 accommodates five different lengths of workpiece assemblies 254 utilizing the cones 216 received in the guide block assemblies 212 along the tailstock guide rails 210. Other configurations could be utilized with different combinations of sizes of workpiece assemblies and weldments 254. The workpiece assembly 254, such as an agricultural implement frame or other weldment (welded) assembly, can be precisely located in the tailstock and headstock assemblies 206, 234 using the clamp subassemblies 240, 241 described above. The headstock assembly 234 actively rotates the workpiece assembly 254 via a suitable rotating drive motor, which can be relatively precisely controlled utilizing an encoder and other suitable positioning controls. The tailstock assembly 206 is adapted for accommodating such rotating movements, as shown in FIG. 13. The rotational axis 232 extends through the clamp assemblies 240, 241 and defines the rotational movement of the workpiece assembly 254. FIG. 14 shows the positioning of a respective tailstock assembly 206 on the tailstock guide rails 210. FIG. 15 shows a tailstock clamp assembly 240 in a closed position. FIG. 16 shows the tailstock clamp assembly 240 in an open position with tapered receivers 214 exposed for receiving tapered cones 216. The clamp arm 244 can be raised and lowered by grasping the distal end 248, which forms a handle, as shown in FIG. 16.

Figure 19:
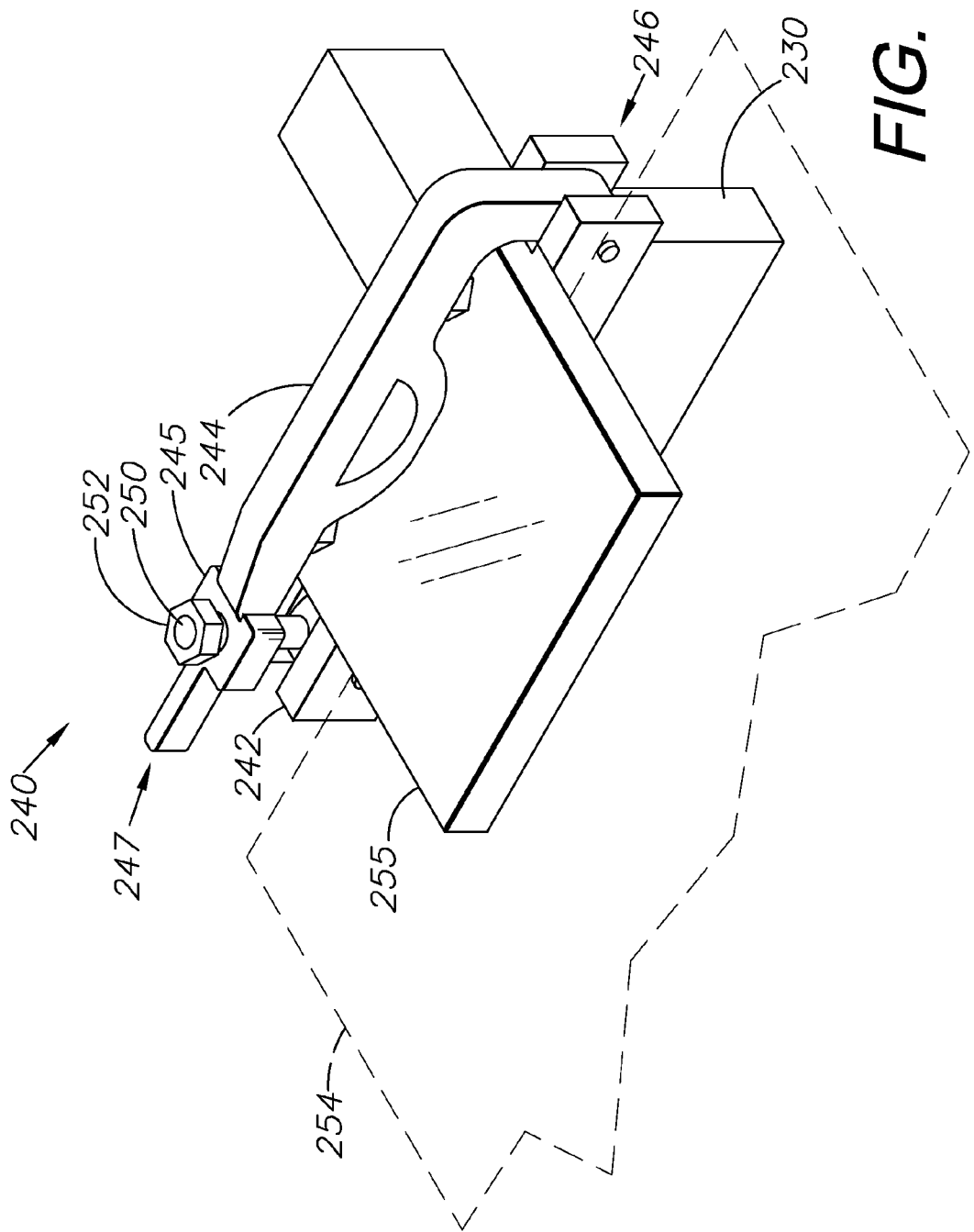
FIG. 19 is a perspective view of the clamp subassembly shown in a closed position clamping the workpiece plate.

FIG. 17 shows the construction of the upper part of the tailstock assembly 206 whereby the clamp subassembly 240 can be mounted on the spindle-and-block 230 by the mounting plate 231. FIG. 18 shows the placement of the workpiece assembly plate 256 in the clamp subassembly 240, with the cones 216 positioned for placement in the corresponding receivers 214. The clamp arm 244 can then be swung downwardly for engaging the plate 255 with the mating surface 247 and secured in a clamping engagement by the swing bolt 250 (FIG. 19).

Other than the functional aspects of the different features of the gantry welding systems 2 and 202, their operations are similar. Each is adapted for relatively efficient and precise welding operations on weldments, workpieces and fixtures of different sizes and configurations.

X. Conclusion

It is to be understood that while certain aspects of the disclosed subject matter have been shown and described, the disclosed subject matter is not limited thereto and encompasses various other embodiments and aspects.

Having thus described the invention, what is claimed as new and desired to be secured by Letters Patent is:

1. An automated welding system adapted for welding a workpiece at a workstation with first and second ends, which system includes:
    a gantry including first and second ends adapted for positioning in proximity to said workstation first and second ends and an elevated platform extending between said gantry ends;
    said gantry forming a welding area below said platform and between said gantry ends;
    a robotic welder with a welding arm;
    a welder guide mounted on said platform and movably mounting said welder for longitudinal movement along said platform between said gantry ends;
    a headstock mounted in proximity to said first workstation end and adapted for mounting the workpiece;
    a tailstock mounted at said workstation in spaced relation from said headstock, said tailstock being adapted for mounting the workpiece;
    a control system adapted for positioning said welder relative to said platform within the welding area, rotating the workpiece within the welding area and positioning said gantry relative to the workpiece;
    a primary mobile power and data distribution system connected to said controller and to said gantry;
    a secondary mobile power and data distribution system connected to said gantry and to said welder;
    one or more adjustable workstations located below said gantry, each said adjustable workstation being adapted for receiving a workpiece for welding by said welder; and
    said controller being adapted for adjustably positioning said workpiece in said one or more adjustable workstations.

2. The welding system according to claim 1, which includes a workpiece positioning subsystem including:
    a locating cone mounted on said workpiece or said clamp; and
    a tapered locating cone receiver mounted on the other of said workpiece or said clamp and selectively receiving said locating cone.

3. The welding system according to claim 1, which includes:
    a pair of gantry guide rails extending in parallel relation on either side of said workstation;
    said gantry guide rails being adapted for placement along a floor slab;
    said gantry including guide rollers rolling along said guide rails; and
    said control system being adapted for controlling the movement of said gantry along said guide rails.

4. The welding system according to claim 3, which includes:
    said workstation being recessed below the floor slab;
    a pair of tailstock guide rails located in said workstation; and
    said tailstock including a pair of guide block assemblies each removably mounted on a respective tailstock guide rail.

5. The welding system according to claim 1, which includes:
    a primary mobile power and data distribution system connected to said controller and to said gantry.

6. An automated welding system, which includes:
    a gantry including first and second ends with rollers mounted thereon and an elevated platform extending between said ends;
    said platform including first and second sides and upper and lower decks;
    a welder mounted on said platform and depending downwardly from said lower deck;

a welder guide mounted on said platform lower deck and movably mounting said welder for longitudinal movement along said platform;

a headstock mounted in proximity to said first workstation end and adapted for mounting the workpiece;

a tailstock mounted at said workstation in spaced relation from said headstock, said tailstock being adapted for mounting the workpiece;

one of said headstock and tailstock being adapted for rotating said workpiece along a rotational axis extending between said headstock and tailstock;

a control system adapted for positioning said welder relative to said platform and positioning said gantry relative to a workpiece;

a primary mobile power and data distribution system connected to said controller and to said gantry; and a secondary mobile power and data distribution system connected to said gantry and to said welder.

7. The welding system according to claim 6, which includes:

said primary mobile power and data distribution system connected to said controller and to said gantry including electrical power and data lines;

said secondary mobile power and data distribution system connected to said controller and to said gantry including electrical power and data lines;

said primary power and data distribution system including a primary flexible cable/hose carrier and a primary guide located alongside a path of movement of said gantry and receiving said primary flexible cable/hose carrier;

said secondary power and data distribution system including a secondary flexible cable/hose carrier and a secondary guide mounted on top of said gantry platform and located alongside a path of movement of said welder and receiving said secondary flexible cable/hose carrier;

said primary flexible cable/hose carrier including a channel elevated above a floor level at approximately the elevation of said gantry platform;

said primary flexible cable/hose carrier being adapted for length adjustment by folding over on itself with movement of said gantry alongside said primary flexible cable/hose carrier;

said secondary flexible cable/hose carrier guide including rollers mounted on top of said gantry platform and rollingly supporting said secondary flexible cable/hose carrier through movement along said gantry platform;

said secondary flexible cable/hose carrier being adapted for length adjustment by folding over on itself with movement of said welder alongside said secondary flexible cable/hose carrier;

a welding wire container mounted on top of said gantry and connected to said welder for supplying welding wire thereto;

each said workstation including a rotary workpiece mount adapted for rotatably mounting a workpiece; and said control system being connected to said rotary workpiece mounts and adapted for rotating workpieces through preprogrammed movements for access by said welder.

8. An automated welding system, which includes:

a gantry including first and second ends with rollers mounted thereon and an elevated platform extending between said ends;

said platform including first and second sides and upper and lower decks;

a pair of welders mounted on said platform and depending downwardly from said lower deck, each said welder including a weld wire spool located adjacent to a respective platform side and each said welder being movable along said platform parallel to a respective platform side;

a welder guide mounted on said platform lower deck and movably mounting said welder for longitudinal movement along said platform;

a control system adapted for positioning said welder relative to said platform and positioning said gantry relative to a workpiece;

a headstock mounted in proximity to said first workstation end and adapted for mounting the workpiece;

a tailstock mounted at said workstation in spaced relation from said headstock, said tailstock being adapted for mounting the workpiece;

one of said headstock and tailstock being adapted for rotating said workpiece along a rotational axis extending between said headstock and tailstock;

a primary mobile power and data distribution system connected to said controller and to said gantry;

a secondary mobile power and data distribution system connected to said gantry and to said welder;

multiple adjustable workstations located below said gantry, each said adjustable workstation being adapted for receiving a workpiece for welding by said welder;

said controller being adapted for adjustably positioning said workpiece in said adjustable workstations;

said primary mobile power and data distribution system connected to said controller and to said gantry including electrical power and data lines;

said secondary mobile power and data distribution system connected to said controller and to said gantry including electrical power and data lines;

said primary power and data distribution system including a primary flexible cable/hose carrier and a primary guide located alongside a path of movement of said gantry and receiving said primary flexible cable/hose carrier;

said secondary power and data distribution system including a secondary flexible cable/hose carrier and a secondary guide mounted on top of said gantry platform and located alongside a path of movement of said welder and receiving said secondary flexible cable/hose carrier;

said primary flexible cable/hose carrier including a channel elevated above a floor level at approximately the elevation of said gantry platform;

said primary flexible cable/hose carrier being adapted for length adjustment by folding over on itself with movement of said gantry alongside said primary flexible cable/hose carrier;

said secondary flexible cable/hose carrier guide including rollers mounted on top of said gantry platform and rollingly supporting said secondary flexible cable/hose carrier through movement along said gantry platform;

said secondary flexible cable/hose carrier being adapted for length adjustment by folding over on itself with movement of said welder alongside said secondary flexible cable/hose carrier;

a welding wire container mounted on top of said gantry and connected to said welder for supplying welding wire thereto;

each said workstation including a rotary workpiece mount adapted for rotatably mounting a workpiece; and said control system being connected to said rotary workpiece mounts and adapted for rotating workpieces through preprogrammed movements for access by said welder.

9. The welding system according to claim 1, further comprising:
   one of said headstock and tailstock being adapted for rotating said workpiece along a rotational axis extending between said headstock and tailstock.

10. The welding system according to claim 9, wherein said gantry generally comprises an A-frame construction.

11. The welding system according to claim 6, further comprising:
   one or more adjustable workstations located below said gantry, each said adjustable workstation being adapted for receiving a workpiece for welding by said welder; and
   said controller being adapted for adjustably positioning said workpiece in said one or more adjustable workstations.

12. The welding system according to claim 9, which includes:
   each said headstock and tailstock including a workpiece clamp adapted for clamping said workpiece in a position for rotation on said rotational axis extending between said headstock and said tailstock.

13. The welding system according to claim 12 wherein each said workpiece clamp includes:
   a base rotatably mounted on said headstock or tailstock;
   a clamp arm mounted on said base; and
   an open position with said clamp arm lifted from said base and a closed position with said clamp arm secured to said base in clamping relation on the workpiece.

14. The welding system according to claim 13 wherein each said workpiece clamp includes:
   a swing bolt pivotably mounted on said base and removably received in said clamp arm; and
   said swing bolt being adapted for receiving a tightening nut for retaining said clamp arm against the workpiece with the clamp in its closed position.

15. The welding system according to claim 14, which includes:
   each said workpiece clamp being mounted on a headstock or tailstock by a block-and-spindle attached to a respective headstock or tailstock, and attached to a respective clamp base.

16. The welding system according to claim 12, which includes:
   a secondary mobile power and data distribution system connected to said gantry and to said welder.

\* \* \* \* \*